United States Patent
Shibata

(10) Patent No.: US 8,798,906 B2
(45) Date of Patent: Aug. 5, 2014

(54) VEHICLE CONTROL DEVICE AND ROTATION DETECTION DEVICE USED IN SAME

(75) Inventor: Kiyotake Shibata, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/353,846

(22) Filed: Jan. 19, 2012

(65) Prior Publication Data

US 2012/0116664 A1  May 10, 2012

Related U.S. Application Data

(63) Continuation of application No. PCT/JP2010/061955, filed on Jul. 15, 2010.

(30) Foreign Application Priority Data

Jul. 22, 2009  (JP) .................................. 2009-170761
Jul. 29, 2009  (JP) .................................. 2009-176182

(51) Int. Cl.
*G05D 1/02*  (2006.01)

(52) U.S. Cl.
USPC ........................................... 701/300; 340/447

(58) Field of Classification Search
USPC ...................... 701/300; 340/447; 303/20, 167
See application file for complete search history.

(56) References Cited

U.S. PATENT DOCUMENTS

| | | | |
|---|---|---|---|
| 6,294,910 B1 | 9/2001 | Travostino et al. | |
| 6,700,367 B1 | 3/2004 | Santos et al. | |
| 6,701,275 B1 | 3/2004 | Muratomi | |
| 7,451,035 B2 | 11/2008 | Nozawa et al. | |
| 7,923,993 B2 | 4/2011 | Takahashi et al. | |
| 8,191,399 B2 | 6/2012 | Schwesig | |
| 2002/0044047 A1* | 4/2002 | Miyakoshi et al. | 340/435 |
| 2004/0164608 A1* | 8/2004 | Ohtsuki et al. | 303/20 |
| 2005/0216167 A1 | 9/2005 | Nozawa et al. | |
| 2009/0277289 A1 | 11/2009 | Schwesig | |
| 2009/0315544 A1 | 12/2009 | Takahashi et al. | |

FOREIGN PATENT DOCUMENTS

| | | |
|---|---|---|
| JP | 64-31053 | 2/1989 |
| JP | 2-39163 | 3/1990 |
| JP | 10-38548 | 2/1998 |
| JP | 10-132939 | 5/1998 |

(Continued)

OTHER PUBLICATIONS

International Search Report for PCT/JP2010/061955 mailed Oct. 19, 2010.

(Continued)

*Primary Examiner* — John Q Nguyen
*Assistant Examiner* — Rodney P King

(57) ABSTRACT

A vehicle control device capable of accomplishing a highly reliable vehicle control with the separation distance recognized correctly, even if a reduction or an error of the detecting capability occurs in the result of measurement by a separation distance measuring section for measuring the separation distance with an object such as inter-vehicle gap is provided. The control device includes a rotation detector for detecting the rotational speed of a vehicle wheel and a vehicle movement amount detecting section for detecting the amount of movement of a vehicle from an output signal thereof. The use is made of a separation distance measuring section such as a laser radar for measuring, on a non-contact basis, the separation distance between the vehicle and the object, and of a vehicle movement control section for controlling the movement of the vehicle using the separation distance and the vehicle movement amount.

21 Claims, 16 Drawing Sheets

(56) References Cited

FOREIGN PATENT DOCUMENTS

| | | |
|---|---|---|
| JP | 2000-310151 | 11/2000 |
| JP | 2001-518608 | 10/2001 |
| JP | 2002-257589 | 9/2002 |
| JP | 2002-541485 | 12/2002 |
| JP | 2004-50925 | 2/2004 |
| JP | 2004-183565 | 7/2004 |
| JP | 2005-84998 | 3/2005 |
| JP | 2005-271721 | 10/2005 |
| JP | 2006-57818 | 3/2006 |
| JP | 2008-232426 | 10/2008 |
| JP | 2009-519445 | 5/2009 |
| WO | WO 99/17081 | 4/1999 |
| WO | WO 00/62079 | 10/2000 |
| WO | WO 2007/068550 A1 | 6/2007 |

OTHER PUBLICATIONS

International Preliminary Report on Patentability mailed Mar. 22, 2012 issued in corresponding International Patent Application No. PCT/JP2010/061955.
Japanese Office Action issued Nov. 26, 2013 in corresponding Japanese Patent Application No. 2009-176182.
Chinese Office Action issued Nov. 26, 2012 in corresponding Chinese Patent Application No. 201080032925.4.
Japanese Office Action mailed Apr. 16, 2013 for corresponding Japanese Application No. 2009-176182.
Chinese Office Action issued Jun. 19, 2013 in corresponding Chinese Application No. 201080032925.4.
Japanese Office Action issued Jul. 2, 2013 in corresponding Japanese Application No. 2009-176182.
Japanese Office Action issued Jul. 16, 2013 in corresponding Japanese Application No. 2009-170761.

* cited by examiner

OUTBOARD SIDE ← → INBOARD SIDE

← OUTBOARD SIDE    INBOARD SIDE →

VEHICLE CONTROL DEVICE AND ROTATION DETECTION DEVICE USED IN SAME

CROSS REFERENCE TO THE RELATED APPLICATIONS

This application is a continuation application, under 35 U.S.C. §111(a), of international application No. PCT/JP2010/061955, filed Jul. 15, 2010, which claims priority to Japanese patent applications No. 2009-170761, filed Jul. 22, 2009, and No. 2009-176182, filed Jul. 29, 2009, the disclosure of which are incorporated by reference in their entirety into this application.

BACKGROUND OF THE INVENTION

1. Field of the Invention

The present invention relates to a vehicle control device for performing, for example, an automatic pilot, an automatic parking, a drive assistance and a parking assistance of an automotive vehicle, to a rotation detector used in the vehicle control device, and to a rotation detector equipped bearing having the rotation detector incorporated therein.

2. Description of Related Art

As a measuring device for measuring the distance between two automotive vehicles, i.e., the inter-vehicle gap, and/or the distance between an automotive vehicle and an object on the road, a inter-vehicle gap sensor (laser radar) of a type utilizing a laser beam has been known. Using a result of measurement, i.e., the inter-vehicle gap, a vehicle control such as, for example, an automatic operation of the automotive vehicle and/or a driving assistance is carried out. In this respect, see the patent document 1 listed below.

Also, in order to perform the vehicle control by accurately detecting a rotating condition of a rotor of, for example, an automotive vehicle or a railway vehicle, demands or desires have hitherto been made to secure a high resolution, highly accurate rotation signal. In a wheel support bearing assembly for rotatably supporting a vehicle wheel relative to a vehicle body, an ABS sensor generally used in an ABS control, that is, an anti-lock brake system control, which is another example of the vehicle control, has been utilized. The ABS sensor has, however, been found that at present the resolving power thereof is not so high. If with such a sensor the rotation can be detected with a high resolution, it can be utilized in a sophisticated vehicle control such as, for example, the automatic operation, the drive assist and/or the safety control in the future. Hitherto, however, a circuit system has been suggested, in which as the rotation detector, a multiplication signal is obtained with a high resolution from a detected rotation signal of sin and cos detected by a magnetic sensor. In this respect, see the patent document 2 listed below.

PRIOR ART DOCUMENT

[Patent Document 1] JP Laid-open Patent Publication No. 2005-271721

[Patent Document 2] JP Laid-open Patent Publication No. 2002-541485

SUMMARY OF THE INVENTION

It has, however, been found those prior art technologies have their own problems as discussed below. The patent document 1 listed above makes use of a inter-vehicle gap sensor of a type utilizing a laser beam, and the detecting capability tends to be lowered when a transmitting and receiving unit is contaminated and/or significant weather occurs. Also, an error tends to occur depending on the angle of an object relative to the transmitting and receiving unit and/or the shape of the object.

On the other hand, if a rotation detector disclosed in the patent document 2 listed above is used in the vehicle control device, a sophisticated vehicle control can be accomplished because with a multiplication signal the behavior of an automotive vehicle can be detected in detail. However, since the output signal resolving power of the rotation detector and the input signal resolving power of the currently largely utilized standard ABS control device differ from each other, it is not possible to connect the rotation detector and the standard ABS control device with each other with no modification made and then to use in practice. In order for them to be connected with each other, a new device having an improved input signal resolving power is required as the ABS control device. In other words, in the ABS control device, an input date increased to the number of data multiplied by the conventional number of data. By way of example, while with the conventional rotation detector, the rotation of the vehicle wheel is by a detected rotation signal of 48 pulses per one complete rotation thereof, assuming that the multiplication power with the previously described rotation detector is 40, one complete rotation of the vehicle wheel will be detected by a detected rotation signal of 1,920 pulses. For this reason, the input data to the ABS control device for unitary time will become enormous particularly in a high speed rotating region and, therefore, a problem has been recognized that no processing can be accomplished with the standard ABS control device, or otherwise the processing tends to be delayed.

In view of the foregoing, the present invention has for its essential object to provide a vehicle control device capable of accomplishing a highly reliable vehicle control with the separation distance recognized correctly, even if a reduction or an error of the detecting capability occurs in the result of measurement conducted by the separation distance measuring unit used to measure the separation distance with an object such as, for example, the inter-vehicle gap. Another important object of the present invention is to provide a rotation detector adapted for use in the vehicle control device, in which the detection resolution can be selected in dependence on the rotational speed of a rotating body of the object to be detected and the detected rotation signal can be processed even with the standard input signal resolving power, and also to provide a bearing assembly having such rotation detector incorporated therein.

The vehicle control device of the present invention, when described with the aid of and with reference to reference numerals employed in the accompanying drawings for the purpose of facilitating a ready understanding of the present invention, includes a rotation detector 1 for detecting the rotational speed of a vehicle wheel 21, a vehicle movement amount detecting section 16 for detecting the amount of movement of a vehicle 20 from a signal outputted by the rotation detector 1, a separation distance measuring section 14 for measuring, on a non-contact basis, the separation distance between the vehicle 20 and an object located at a position within a region measurable from the vehicle 20, and a vehicle movement control section 17 for controlling the movement of the vehicle 20 with the utilization of the separation distance, detected by the separation distance measuring section 14, and the amount of movement of the vehicle detected by the vehicle movement amount detecting section 16.

According to the construction described above, the vehicle movement control section 17 controls the automotive vehicle 20 by the utilization of not only the separation distance, which will be a result of measurement conducted by the separation distance measuring section 14, but also the vehicle movement amount, over which the automotive vehicle has actually moved, that is detected by the rotation detector 1 and the vehicle movement amount detecting section 16. For this reason, even when an error occurs in the result of measurement because of a reduction in detecting capability, brought about by, for example, contamination of the transmitting and receiving unit and/or the bad weather, or brought about in dependence on, for example, the angle of the object relative to the transmitting and receiving unit and/or the shape of the object, the vehicle control can be accurately achieved by the concurrent use of the vehicle movement amount by means of the detection of the rotation.

The rotation detector 1 is preferably of a type having a high resolving power. By way of example, the rotation detector 1 may include an annular encoder 2 having a plurality of circumferentially equidistantly juxtaposed to-be-detected poles provided on a rotating ring, forming a part of a vehicle wheel support bearing assembly 10 for the support of a vehicle wheel 21, a sensor 3 for detecting the to-be-detected poles of the encoder 2, and a multiplying segment 4 for multiplying the phase of the to-be-detected poles from an output of the sensor 3, in which the vehicle movement amount detecting section 17 is operable to detect the amount of movement of the vehicle 20 from a pulse output multiplied by the multiplying segment 4.

The use of the multiplying segment 4 in the manner described above is effective to accomplish a rotation detection with a higher resolution than the pitch of arrangement of the detecting electrodes of the encoder 2. By performing the rotation detection with the high resolution, the accuracy, with which the amount of movement of the automotive vehicle is detected to such an extent enough to compensate for an error by the separation distance measuring section, can be increased. Also, when the rotation detector 1 is mounted on the wheel support bearing assembly, the rotation detector 1 can be installed compactly in the automotive vehicle with an undesirable increase of the number of assembling steps suppressed. It is, however, to be noted that where the encoder 2 is employed in the form of the magnetic encoder, the pitch of arrangement of the detecting electrodes will hardly be chosen to be small although a reduction in detecting performance, which would result from contamination, will little occur as compared with an optical system. However, the use of the multiplying segment 4 in the manner described above is effective to ensure that a required high resolving power can be obtained.

The separation distance measuring section 14 referred to above may be of a type capable of measuring the separation distance to an object by means of an optical technique. For this type of the separation distance measuring section 14, a inter-vehicle gap sensor such as, for example, a laser radar utilizing a laser beam has been placed in practical use, which is excellent in detecting accuracy, and this type of sensor can be employed therefor.

In the present invention, as a comparison between the amount of movement of the vehicle, detected by the vehicle movement amount detecting section 16, and the separation distance, measured by the separation distance measuring section, 14 a correcting segment 19 for correcting the separation distance, which is a measured value of the separation distance measuring section 14, is provided in the vehicle movement control section 17.

By way of example, by comparing the travelling distance, detected by the rotation detector 1 and determined by the vehicle movement amount detecting section, and the travelling distance (that is, the difference between the distance to the object at the time of start of the distance measurement and the distance to the object at the time of termination of the distance measurement), measured by the separation distance measuring section 14, during the time of travel over a predetermined distance, it is possible to accurately determine how far the distance to the object such as, for example, the leading vehicle is actually. Two specific examples of the comparison between the separation distance, measured by the separation distance measuring section 14 during the travel, and the traveling distance determined from the rotation detection will now be enumerated. In the first example, the correction is regularly performed and a result of the immediately preceding correction conducted between a fixture and the automotive vehicle is utilized as it has been presented. Unless a contaminated condition of the separation distance measuring section 14 changes abruptly, this method can be employed. The second example is a method in which the speed of the automotive vehicle is intentionally (mechanically) changed and the amount of change in distance from the leading vehicle, measured by the separation distance measuring section 14, and the amount of change in distance, determined by the rotation detector 1 (including the multiplying segment 4), are subsequently compared with each other. Since the speed of the automotive vehicle can be read from the rotation detector 1 (in which the multiplying segment 4 may be used), it is possible to determine the estimated amount of movement, when no speed is changed, and the amount of movement, when the speed is changed, from the relation in change between the time and the speed. When this distance is compared with the amount of change in distance determined by the separation distance measuring section 14 before the change of the speed and the amount of change in distance determined by the separation distance measuring section 14 after the change of the speed, correction is possible.

It is to be noted that since where the multiplying segment 14 is used for the rotation detection, it is possible to detect the amount of a slight rotation of a wheel tire, the correction is possible even if the amount of change in speed and the time of change are small. Also, with respect to the presence or absence of the change in speed of the leading vehicle, after the correction, the speed of the own vehicle at the time of correction is restored to the speed before the change and, if the amount of change in distance from the leading vehicle at this time is identical with that before the correction, it is assumed that no change in speed has occurred in the leading vehicle.

Where the correcting segment 19 is employed, the use of the multiplying segment 4 is preferred. For example, the rotation detector 1 is so designed as to include an annular encoder 2 provided in a rotating ring, which forms a part of a wheel support bearing assembly 10 for supporting the vehicle wheel 20 and which has a plurality of circumferentially juxtaposed and equidistantly spaced to-be-detected poles, a sensor 3 for detecting the to-be-detected poles of the encoder 2, and a multiplying segment 4 for multiplying the phase of the to-be-detected poles from an output of the sensor 3, in which the correcting segment 19 referred to above conducts the correction with the use of a pulse output multiplied by the multiplying segment 4. Where the multiplying segment 4 is employed, the difference between the distance of travel, determined by the vehicle movement amount detecting section 6, and the distance of travel determined by the separation distance measuring section 14 can be further accurately determined.

In the present invention, the vehicle movement control section 17 may perform a vehicle control with the use of the rotational speed, detected by the rotation detector 1, after the separation distance has been measured by the separation distance measuring section 14. Alternatively, the vehicle movement control section 17 may perform a vehicle control with the use of the separation distance, detected by the separation distance measuring section 14, after the separation distance has been measured by the separation distance measuring section 14. In either case, the measurement of the separation distance by the separation distance measuring section 14 is preferably corrected by the provision of the correcting segment 4 and, after the separation distance so corrected has been determined, the vehicle control by the vehicle movement control section 17 is preferably performed.

Also, where after the measurement of the separation distance, the vehicle control is carried out with the use of the rotational speed detected by the rotation detector 1, it is preferred that the use is made of the multiplying segment 4 so that the detected rotational speed of a high resolving power can be utilized. By way of example, the rotation detector 1 is so designed as to include annular encoder 2 provided in a rotating ring, which forms a part of a wheel support bearing assembly 10 for supporting the vehicle wheel 20 and which has a plurality of circumferentially juxtaposed and equidistantly spaced to-be-detected poles, a sensor 3 for detecting the to-be-detected poles of the encoder 2, and a multiplying segment 4 for multiplying the phase of the to-be-detected poles from an output of the sensor, in which a vehicle control after the separation distance has been measured by the separation distance measuring section 14 is performed with the use of the pulse output multiplied by the multiplying segment 4.

In the present invention, the rotation detector may include an annular encoder 2 provided in a rotating ring, which forms a part of a wheel support bearing assembly for supporting the vehicle wheel 21 and which has a plurality of circumferentially juxtaposed and equidistantly spaced to-be-detected poles, a sensor 3 for detecting the to-be-detected poles of the encoder 2, a multiplying segment 4 for multiplying the phase of the to-be-detected poles from an output of the sensor 3, and a pulse output segment 5 adapted to receive an output of the multiplying segment 4 or both of the output of the multiplying segment 4 and a detection output of the sensor 3 and outputting pulses of at least two different magnification powers, in which the vehicle movement control section 17 conducts a movement control of the vehicle with the use of the pulses of the at least two types of the magnification power.

According to the construction described above, since the rotation pulses of two or more types of resolving powers are outputted, where a plurality of controls are to be performed with the rotation detector 1, the rotation pulses of the resolving power appropriate to the purpose of control can be utilized. For example, it is desirable in terms of the accuracy to utilize the rotation pulses of the high resolving power when the control of the traveling speed of the vehicle and the control of a parking position are to be performed for the automatic parking. In the case of the control for the anti-lock brake system, too high accuracy of the rotation detection is needed and, since the standard anti-lock brake system is so provided that the resolving power of its input pulse may be low, the capability of the conventional ECU may be surpassed with the pulse output of the high resolving power, the conventional standard anti-lock brake system can no longer be used. If the rotation pulses of the two or more resolving powers are outputted, a proper control can be accomplished with the use of the rotation pulse of the resolving power appropriate to the particular purpose of control.

Also, by selecting the detection resolving power in accordance with the rotational speed of the rotor of the object to be detected, the detected rotation signal can be processed even with the process control device having the standard input signal resolving power. In other words, where the rotation detector is incorporated in, for example, the wheel support bearing assembly to detect the rotation of the vehicle wheel, if the signal processing capability of the vehicle ABS control device, which is a process control device, is standard, it may often occur that when the high resolution rotation pulse is inputted during a high speed travel, the ABS control device will become unable to process the input signal or the processing will be delayed. In such case, if a method of use is employed in which the rotation pulse of a low magnification power is selected and inputted during the high speed travel, but the rotation pulse of a high magnification power is selected and inputted during the low speed travel, the signal can be satisfactorily processed even with the standard ABS control device.

In the present invention, the rotation detector 1 referred to above may include an annular encoder 2 provided in a rotating ring, which forms a part of a wheel support bearing assembly for supporting the vehicle wheel and which has a plurality of circumferentially juxtaposed and equidistantly spaced to-be-detected poles, a sensor 3 for detecting the to-be-detected poles of the encoder 2, a multiplying segment 4 for multiplying the phase of the to-be-detected poles from an output of the sensor 3, and a pulse output segment 5 adapted to receive an output of the multiplying segment 4 or both of the output of the multiplying segment 4 and a detection output of the sensor 3 and outputting pulses of at least two different magnification powers, in which the vehicle movement control section 17 conducts a movement control of the vehicle with the use of a pulse of the at least one magnification powers outputted by the pulse output segment 5 and, also, an ABS control by means of a pulse of the other magnification power.

Where the pulse output segment 5 capable of outputting the pulses of the two types of different magnification powers is employed, the pulse of the lowest magnification power that is outputted is preferably equal to the number of pulses outputted by the sensor 3. Most of the standard anti-lock brake systems are of a type capable of responding to non-multiplied pulses and, therefore, if it is made equal to the pulse number outputted by the sensor 3, most of those conventional standard anti-lock brake systems can be employed.

If the pulse output segment 5 is provided, a pulse of at least one magnification power outputted by the pulse output segment may be rendered to be a phase difference signal of A and B phases different in phase from each other. Alternatively, with it rendered to be the phase difference signal of the A and B phases displaced 90° in phase from each other, the vehicle movement control section 17 may be of a type including a forward-rearward movement direction determining segment for determining whether the direction of movement of the vehicle is forward or rearward. According to the phase difference signal of the A and B phases displaced 90° in phase from each other, the direction of rotation can be detected and the direction of travel of the vehicle can be determined by the forward and rearward traveling direction determining segment 23. Accordingly, even at the time of, for example, parking control, a proper vehicle control can be carried out.

In the present invention, the vehicle control conducted by the vehicle movement control section 17 may be an automatic operation for forward movement. In the case of the automatic parking, by means of the accurate detection accomplished with the use of the separation distance relative to the object such as, for example, the inter-vehicle gap and the actual traveling distance by the rotation detection, the highly reliable automatic operation can be carried out.

In the present invention, the vehicle control conducted by the vehicle movement control section 17 may be an automatic parking to park the vehicle at a target position. In the case of the automatic parking, by the highly accurate detection achieved with the use of the separation distance to the object and the actual traveling distance by the rotation detection, a proper parking can be carried out.

In the present invention, the rotation detector 1 includes a multiplying segment 4 for multiplying the phase of the to-be-detected poles from an output of the sensor 3, a pulse output segment 5 adapted to receive an output of the multiplying segment 3 and for outputting pulses of at least two different multiplying powers, a speed detecting segment 37 for detecting the rotational speed of the rotor, and a pulse selecting and outputting segment 38 for selecting and outputting the pulse of at least one magnification power of the pulses outputted by the pulse output segment in dependence on the rotational speed detected by the speed detecting segment 37.

According to the construction described above, the multiplied pulse having the phase within the to-be-detected poles of the encoder 2 multiplied is outputted from the multiplying segment 4 and, in the pulse output segment 5 based on the multiplied pulse, the rotation pulses of the two or more different magnification power are outputted. Also, of the pulses outputted by the pulse output segment 5 in dependence on the rotational speed of the rotor of the object detected by the speed detecting segment 37, the pulse of one type of the magnification power is selected and outputted by the pulse selecting and outputting segment 38. For this reason, the detection resolving power can be detected in dependence on the rotational speed of the rotor, the detected rotation signal can be processed even with the process control device having the standard input signal resolving power, and a highly accurate rotation detection can be achieved.

In the present invention, the pulse selecting and outputting segment 38 may select and output the pulse of the highest magnification power when the rotational speed detected by the speed detecting segment is a low velocity, but may output the pulse of the lowest magnification power when the rotational speed so detected is a high velocity. In the case of this construction described above, without being affected by the rotational speed, the number of output pulses per unitary time can be minimized and, therefore, it is possible to sufficiently accommodate even though the process control device such as, for example, the ABS control device for receiving and inputting the rotation pulses has the conventional, standard input signal resolving power.

In the present invention, the magnification power of the pulse outputted by the pulse output segment 5 may be continuously variable, in which case the pulse selecting and outputting segment 38 continuously variably selects and outputs the pulse of the magnification power appropriate to the rotational speed detected by the speed detecting segment 37. In the case of this construction, the magnification power of the output pulse can be carefully selected in dependence on the change in rotational speed.

In the present invention, the speed detecting segment 37 may be such that the sensor detects the rotational speed from an output of an extra sensor.

In the present invention, the use may be made of a magnification power changing segment for changing from outside a setting of the magnification power of the pulse outputted by the pulse output segment.

In the present invention, the number of the encoder may be one, in which case a detection output of the sensor 3 for detecting the to-be-detected poles of the encoder 2 is inputted to the multiplying segment 4. In the case of this construction, for outputting the rotation pulse of the high resolving power (high magnification power) and the rotation pulse of the low resolving power (low magnification power), there is no need to use two type of sensors and, therefore, an undesirable increase of the space and the weight can be avoided.

In the present invention, the encoder 2 may be a magnetic encoder.

In the present invention, the sensor 3 may be comprised of a line sensor 3A and 3B having a plurality of sensor elements juxtaposed in a direction conforming to the direction of arrangement of the to-be-detected poles of the encoder and outputs a two phase sinusoidal signal by means of calculation to detect the phase within one to-be-detected pole. In the case of this construction described above, since influences brought about by strains of the to-be-detected poles and noises are reduced, the phase of the encoder 2 can be detected with a high accuracy.

A rotation detector equipped bearing assembly designed in accordance with the present invention is of a type having incorporated therein the rotation detector as defined hereinabove. According to this construction, the detection resolving power can be selected in dependence on the rotational speed of the rotor of the object to be detected and the detected rotation signal can be processed even with the process control device having the standard input signal resolving power. Also, in the case where the rotation detector equipped bearing assembly is a wheel support bearing assembly, the detection resolving power can be selected in dependence on the vehicle speed and the detected rotation signal can be processed even with the ABS control device having the standard input signal resolving power.

In the present invention, the bearing assembly referred to above is a vehicle wheel support bearing assembly for supporting a driven wheel, in which the sensor may be covered with a cap. In the case of this construction, an undesirable ingress of muddy water or the like from the outside can be avoided and the reliability of the rotation detector can be increased.

In the present invention, the bearing assembly is a vehicle wheel support bearing assembly for supporting a drive wheel, in which case the use may be made of a sealing member for sealing a bearing end portion of a bearing space formed between an outer member and an inner member, the outer and inner members being rotatable relative to each other. Even in the case of this construction, an undesirable ingress of muddy water or the like from the outside can be avoided and the reliability of the rotation detector can be increased.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

A first embodiment of the present invention will now be described in detail with particular reference to FIGS. 1 to 8.

Figure 1:
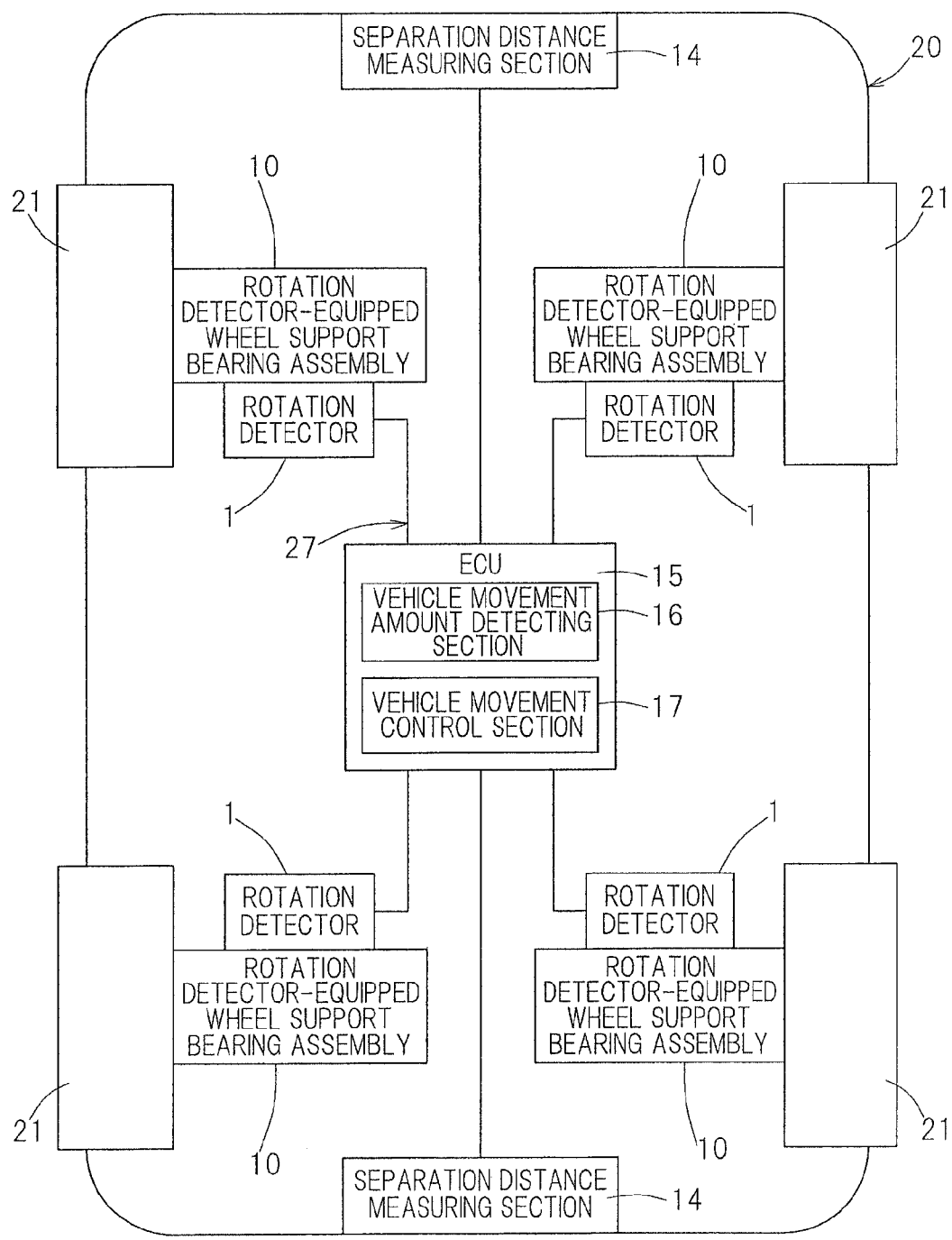
FIG. 1 is a diagram showing a schematic structure of a vehicle control device designed in accordance with a first embodiment.

As best shown in FIG. 1, a vehicle control device shown therein includes a rotation detector 1 for detecting the rotational speed of each of vehicle wheels 21, a vehicle movement amount detecting section 16 for detecting the amount of movement of a vehicle 20 from a signal outputted by the rotation detector 1, a separation distance measuring section 14, a separation distance measuring section 14 for measuring, on a non-contact basis, the separation distance between the vehicle 20 and an object located at a position within a region measurable from the vehicle 20, and a vehicle movement control section 17 for controlling the movement of the vehicle 20 with the utilization of the separation distance, detected by the separation distance measuring section 14, and the amount of movement of the vehicle 20 detected by the vehicle movement amount detecting section 16. The vehicle 20 referred to above may be any automotive vehicle such as, for example, a passenger car or a cargo truck. The vehicle 20 is provided with a vehicle mounted ECU 15, which is an electric control unit for controlling the vehicle 20 in its entirety, and as respective parts of this vehicle mounted electric control unit 15, the separation distance measuring section 14 and the vehicle movement amount detecting section 16 are employed. The vehicle mounted ECU 15 includes a computer and a software program executed by such computer and the vehicle mounted ECU 15 is connected with each of the rotation detectors 1 and the separation distance measuring sections 14 by means of wiring, which defines an intra-vehicle LAN 27.

The separation distance measuring section 14 is preferably capable of measuring the separation distance between the vehicle and the object by means of an optical technique. For the separation distance measuring section 14 of the type referred to above, a inter-vehicle gap sensor utilizing a laser beam, such as, for example, a laser radar, has been placed in practical use, which is excellent in detecting accuracy, and this type of sensor can be employed therefor. The separation distance measuring section 14 may be employed, other than that described above, in the form of a system including a camera of a type utilizing, for example, a solid state image sensing element, and a unit for processing an image taken thereby. This separation distance measuring section 14 may be provided in one in number at a front portion of the vehicle 20, but in the illustrated embodiment now under discussion, one separation distance measuring section 14 is provided at front portion of the vehicle 20 and another separation distance measuring section 14 is provided at rear portion of the vehicle 20. Also, the separation distance measuring section 14 at the front portion of the vehicle 20 is employed in the form of a inter vehicle distance sensor utilizing a laser beam whereas the separation distance measuring section 14 at the rear portion is employed in the form of the system including a camera and an image processing unit. Where a plurality of separation distance measuring sections 14 are employed, respective outputs of all of the separation distance measuring sections 14 may be inputted to the vehicle movement amount detecting section 16 or, alternatively, an output of only one of the separation distance measuring sections 14, for example, the front separation distance measuring section 14 may be inputted to the vehicle movement amount detecting section 16.

A wheel support bearing assembly for supporting each of wheels 21 of the automotive vehicle 20 is rendered to be a rotation detector equipped bearing assembly 10 having the rotation detector 1 incorporated therein, and an output of the rotation detector 1 of each of those rotation detector equipped bearing assemblies 10 is inputted to the vehicle movement amount detecting section 16 through an input unit of the vehicle mounted ECU 15. Although in the illustrated embodiment now under discussion, all of the wheel support bearing assemblies, for supporting front and rear vehicle wheels shown in upper and lower portion of FIG. 1 are shown as employed in the form of the rotation detector equipped bearing assemblies 10, some of the wheel support bearing assemblies, for example, those for the front vehicle wheels or the rear vehicle wheels, may be the rotation detector equipped bearing assemblies 10. In such case, the front vehicle wheels and the rear vehicle wheels may be drive wheels and driven wheels, respectively, or alternatively the front vehicle wheels and the rear vehicle wheels may be driven wheels and drive wheels, respectively. Also, the vehicle movement amount detecting section 16 may be assigned to detect the amount of movement of the automotive vehicle 20 from outputs of the rotation detectors 1 in all of the rotation detector equipped bearing assemblies 10 in the automotive vehicle 20 or, alternatively, the vehicle movement amount detecting section 16 may be assigned to detect the amount of movement of the automotive vehicle 20 from outputs of the rotation detectors 1 in some of the rotation detector equipped bearing assemblies 10, for example, the rotation detector equipped bearing assemblies 10 for the front vehicle wheels or the rear vehicle wheels, or the rotation detector equipped bearing assemblies 10 for the drive wheel or wheels or for the driven wheel or wheels. Furthermore, the vehicle movement amount detecting section 16 may be assigned to detect the amount of movement of the automotive vehicle 20 from an output of the rotation detector 1 in only one of the rotation detector equipped bearing assemblies 10.

Figure 3:
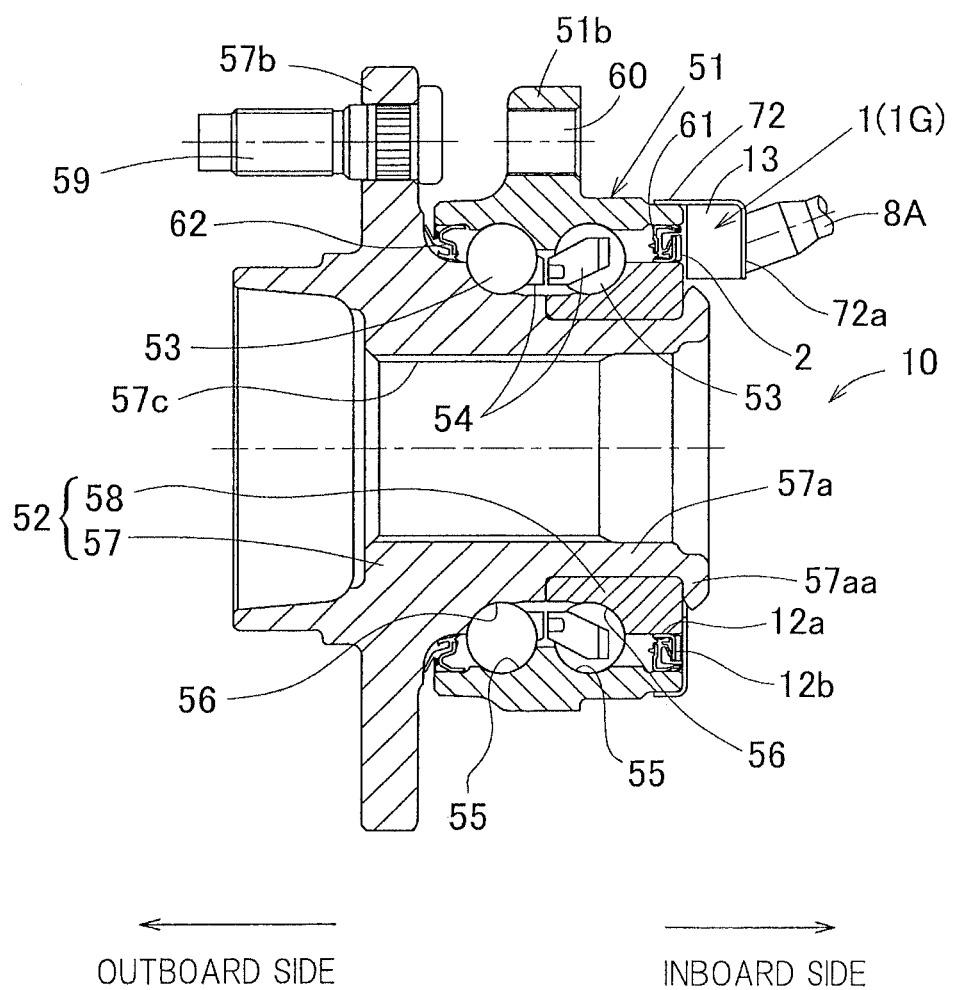
FIG. 3 is a sectional view showing one example of a wheel support bearing assembly equipped with the rotation detector in the vehicle control device.
Figure 4:
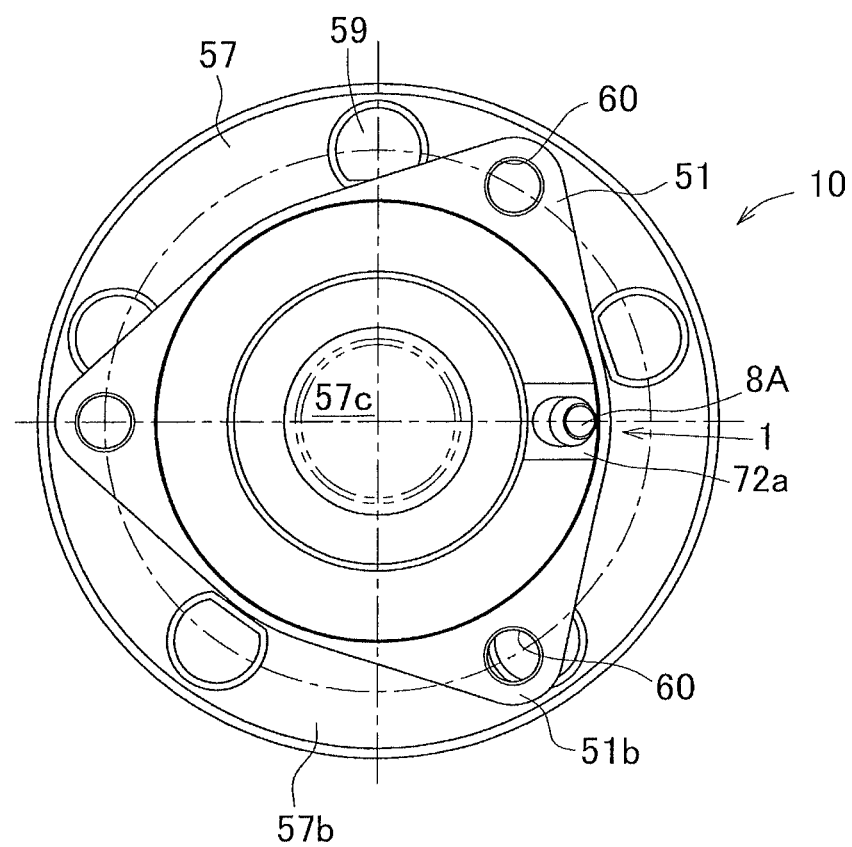
FIG. 4 is a side view showing the rotation detector equipped vehicle wheel support bearing assembly as viewed from an inboard side.

FIG. 3 illustrates one example of the rotation detector equipped bearing assembly 10. It is to be noted that the terms "outboard" and "inboard" used in describing the details of the present invention are to be understood as representing one side of the vehicle body away from the longitudinal center of the vehicle body and the other side of the vehicle body close to the longitudinal center of the vehicle body, respectively, when assembled in the vehicle body. FIG. 4 illustrates a side view of the wheel support bearing assembly 10 as viewed from the inboard side. This rotation detector equipped bearing assembly 10 is of a design, in which a plurality of rows of rolling elements 53 are interposed between an outer member 51 and an inner member 52 for rotatably supporting the respective vehicle wheel relative to the vehicle body, and has the previously described rotation detector 1 incorporated therein.

The outer member 51 is a stationary member and the inner member 52 is a rotating member. Each of the rows of the rolling elements 53 are retained by a retainer 54 employed for each row and are interposed between a plurality of rows of rolling surfaces 55, defined in an inner periphery of the outer member 51, and a plurality of rows of rolling surfaces 56 defined in an outer periphery of the inner member 52. Those wheel support bearing assemblies are rendered to be a double row angular contact ball bearing type and the rolling surfaces 55, 55 and 56, 56 in respective rows are so formed as to have respective contact angles held in back-to-back relation to each other.

The example shown in FIG. 3 is a so-called third generation type and is applied to support a drive wheel. The inner member 52 is made up of a hub axle 57 and an inner ring 58 mounted on an outer periphery of an inboard end portion of an axle portion 57a of the hub axle 57, and the rolling surfaces 56 of each row are formed in the axle portion 57a of the hub axle 57 and the outer periphery of the inner ring 58, respectively. The axle portion 57a of the hub axle 57 has a center bore 57c defined therein for the passage of a stem portion (not shown) of a constant velocity joint therethrough. The inner ring 58 is mounted on a stepped portion formed in the axle portion 57a of the hub axle 57 and fixed to the hub axle 57 by means of a crimped portion 57aa provided at an inboard end of the axle portion 57a. The hub axle 57 has a wheel mounting flange 57b defined in a portion thereof adjacent an outboard end thereof, and the vehicle wheel and a brake rotor (both not shown) are fitted to the wheel mounting flange 57b in an overlapped relation with each other by means of hub bolts 59. The hub bolts 59 are press fitted into respective bolt mounting holes defined in the wheel mounting flange 57b. The outer member 51 is of one piece construction including a vehicle body fitting flange 51b defined in the outer periphery thereof. The outer member 51 is fitted to a knuckle (not shown) of a suspension device by means of knuckle bolts inserted into respective bolt insertion holes 60 defined in the vehicle body fitting flange 51b. A bearing space delimited between the outer member 51 and the inner member 52 has its opposite ends sealed respectively by sealing members 61 and 62 each being in the form of a contact seal or the like.

Figure 5A:
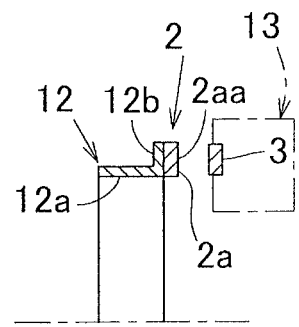
FIG. 5A is a fragmentary sectional view showing a structural example of an encoder employed in the rotation detector.
Figure 5B:
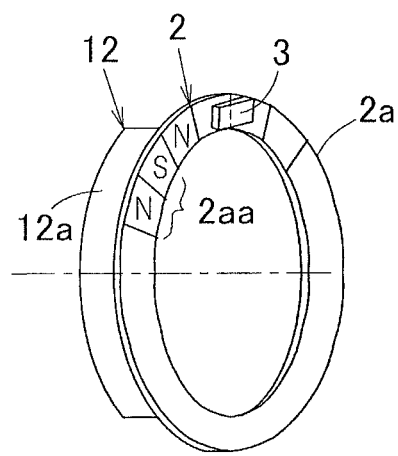
FIG. 5B is a perspective view of the encoder.
Figure 6A:
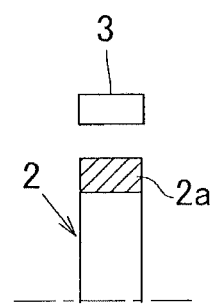
FIG. 6A is a fragmentary sectional view showing another structural example of the encoder employed in the rotation detector.
Figure 6B:
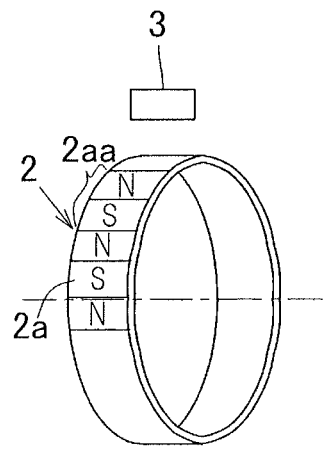
FIG. 6B is a perspective view of the encoder.

The rotation detector 1 includes an annular encoder 2 and a sensor unit 13. For example, as shown in FIGS. 5A and 5B, the encoder 2 is a magnetic encoder of a type having a ring shaped core metal 12, to which a ring shaped multipolar magnet 2a having a plurality of magnetic poles N and S alternating in a direction circumferentially thereof is fitted. Each neighboring magnetic poles N and S form a magnetic pole pair 2aa defining one to-be-detected pole. The multipolar magnet 2a may be a rubber magnet, a plastic magnet, a sintered magnet or a magnet piece or the like prepared from a magnet member such as, for example, ferrite. The core metal 12 is rendered to be of an L-sectioned configuration having a cylindrical wall portion 12a and an upright wall portion 12b, with the multipolar magnet 2a fitted to an outer face of the upright wall portion 12b. A sensor 3 of the sensor unit 13 is a magnetic sensor and confronts the multipolar magnet 2a of the magnetic encoder 2 in an axial direction. It is, however, to be noted that the magnetic encoder 2 and the sensor 3 may be opposed to each other in, for example, a radial direction as shown in FIGS. 6A and 6B.

Referring now to FIG. 3, the magnetic encoder 2 concurrently serves as a slinger, which is a component part of the inboard sealing member 61, and is mounted on an outer periphery of an inboard end of the inner ring 58.

The sensor unit 13 is fitted to an inboard end of the outer member 51 through a sensor mounting member 72. The sensor mounting member 72 is in the form of a ring shaped metallic plate that is mounted on the outer peripheral surface of the outer member 51 so as to engage an end face thereof, and has a circumferential portion thereof formed with a sensor mounting piece 72a to which the sensor unit 13 is fitted. A cable 8A is drawn outwardly from the sensor unit 13. A circuit configuration of the sensor unit 13 is shown in FIG. 1.

Figure 2:
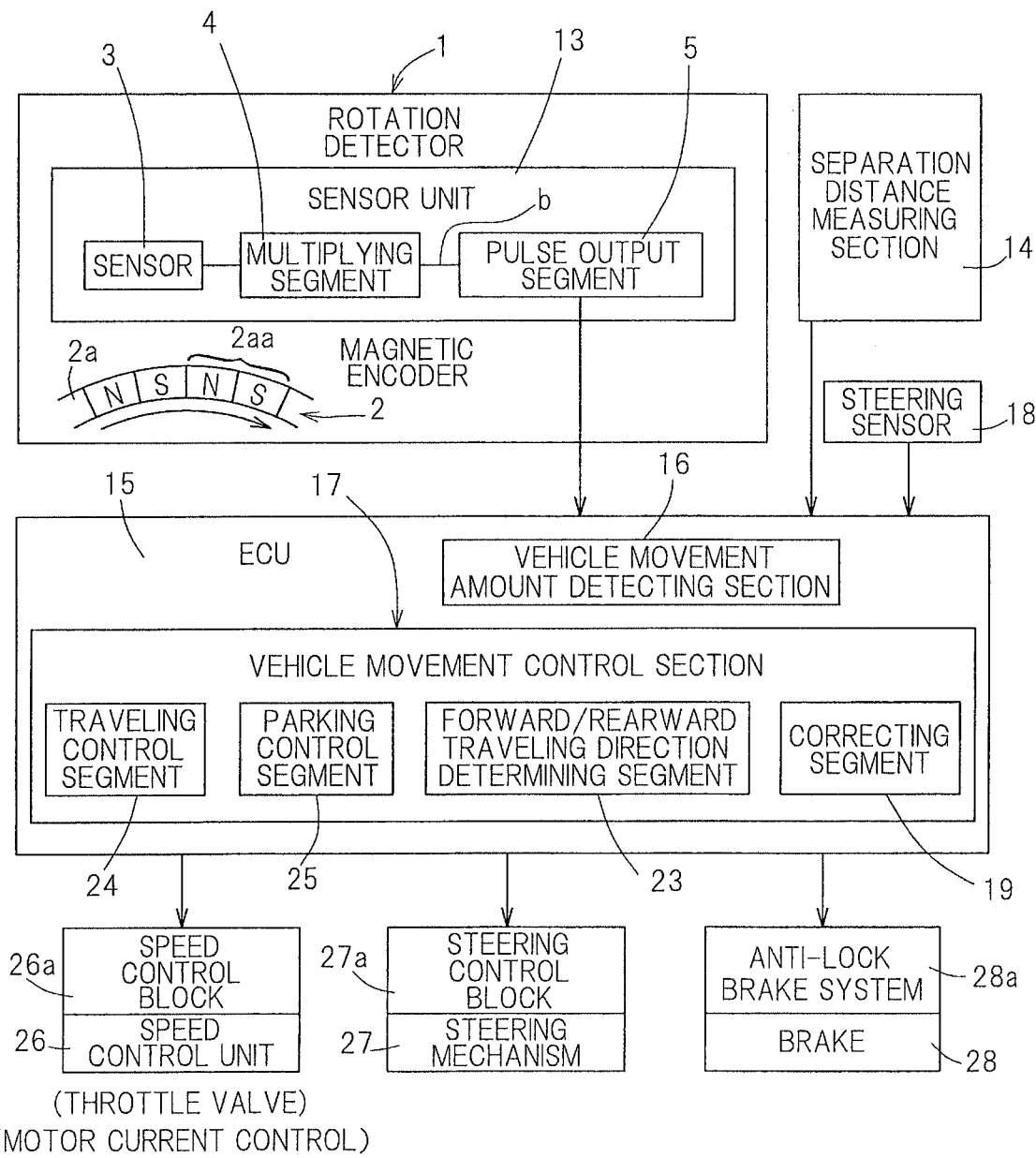
FIG. 2 is a block diagram showing the vehicle control device.

Referring to FIG. 2, the sensor unit 13 includes the sensor 3 for detecting the to-be-detected poles of the magnetic encoder 2, a multiplying segment 4 for generating a multiplied pulse b by multiplying the phase within the to-be-detected poles by a multiplication power N from an output of the sensor 3, and a pulse output segment 5 for outputting a rotation pulse of two or more different magnification powers on the basis of the multiplied pulse b outputted from the multiplying segment 4. The sensor 3 is a magnetic sensor. The multiplication power N outputted by the multiplying segment 4 is rendered to be about 10 to 40 such as, for example, 10, 20 or 40. The pulse output segment 5 has a plurality of output terminals from which rotation pulses of a plurality of types of multiplication powers are outputted. The pulse output segment 5 renders the rotation pulse of the smallest magnification power of all of the rotation pulses of the plural magnification powers outputted to be a pulse of the multiplying power of 1, that is, of the same frequency as that of the pulse outputted by the sensor 3. In such case, the pulse output segment 5 may be so designed as to output the rotation pulse of the multiplying power of 1 from the multiplied pulse b inputted from the multiplying segment 4, or may be provided with a segment for outputting a pulse inputted from the sensor 3 directly to the pulse output segment 5 without passing through the multiplying segment 4.

It is to be noted that the rotation pulse signal of the multiplying power of 1 outputted from the pulse output segment 5 is used in controlling an anti-lock brake system 28a. The anti-lock brake system generally manufactured nowadays does not accommodate a highly precise pulse output and, therefore, arrangement has been so made as to output the rotation pulse signal of the multiplying power of 1 as discussed above.

The sensor 3, the multiplying segment 4 and the pulse output segment 5 are provided as a single integrated circuit 8 such as, for example, an IC chip, or circuit components such as, for example, integrated circuits forming the sensor 3, the multiplying segment 4 and the pulse output segment 5, respectively, are mounted on a single wiring substrate. Accordingly, mounting of the rotation detector 1 onto the wheel support bearing assembly can be accomplished compactly and a reduction in weight can also be accomplished.

Figure 7A:
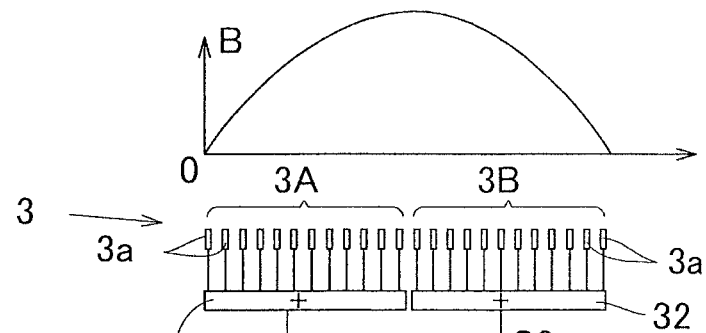
FIGS. 7A to 7C are explanatory diagrams showing one example of an internal structure of the sensor employed in the rotation detector and examples of waveforms of an output thereof.
Figure 7B:
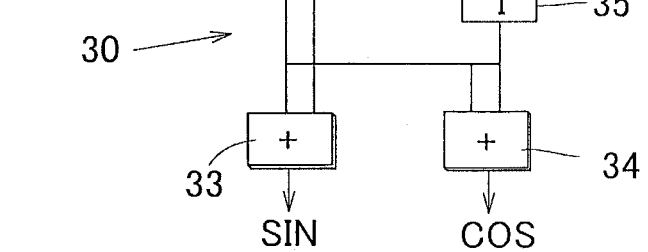
Figure 7C:
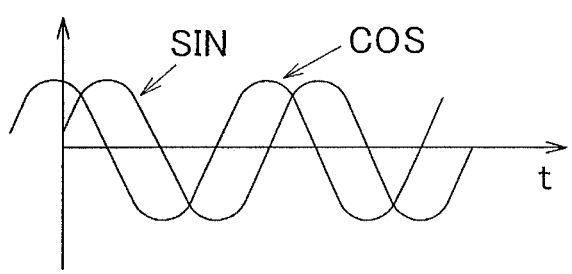

The sensor 3 referred to above is made up of line sensors 3A and 3B, and a calculating and amplifying segment 30, as shown in FIG. 7B. The line sensors 3A and 3B includes a plurality of magnetic sensor elements 3a arranged relative to each other in a direction conforming to the direction of arrangement of the magnetic poles of the magnetic encoder 2 and spaced equidistantly from each other. The calculating and amplifying segment 30 includes a plurality of adder circuits 31, 32, 33 and 34 and an inverter 35. It is to be noted that FIG. 7A illustrates the interval of one magnetic pole of the magnetic encoder 2 which is converted into the magnetic field strength and is then shown in a waveform chart. In this case, the first line sensor 3A is arranged in correspondence with a 90° phase interval of the 180° phase interval shown in FIG. 7A, and the second line sensor 3B is arranged in correspondence with the remaining 90° phase interval. By so arranging, by adding together a signal S1, in which a detection signal of the first line sensor 3A is added by the adder circuit 31, and a signal S2, in which a detection signal of the second line sensor 3B is added by the adder circuit 32, by means of the adder circuit 33, a sin signal corresponding to a magnetic field signal as shown in FIG. 7C is obtained. Also, by adding the signal S1 and the signal S2 through the inverter 35 together by means of the adder circuit 34, a cos signal corresponding to a magnetic field signal as shown in FIG. 7C is obtained. From the two phase output signal so obtained, the position within the magnetic poles can be detected.

When the magnetic sensor 3 is configured as the line sensors as hereinbefore described, influences brought about by a strain in magnetic field pattern and noises are reduced and, therefore, the phase of the magnetic encoder 2 can be detected with a high accuracy. It is to be noted that the sin signal referred to above and the cos signal referred to above are hereinafter referred to as the A phase signal and the B phase signal, respectively. If the sensor 3 capable of outputting the A and B phase signals having a phase difference of 90° is employed, the pulse output segment 5 shown in FIG. 1 may be so constructed that high resolution rotation pulses of the A and B phase, respectively, can be outputted as described later with reference to FIG. 11.

Also, as an example of the magnetic sensor 3 other than that described above, assuming that the pitch λ of one magnetic pole pair of the magnetic encoder 2 is one cycle, the use may be made of two magnetic sensor elements such as, for example, Hall elements arranged spacedly in a direction conforming to the direction of arrangement of the magnetic poles so as to establish the 90° phase difference (λ/4) and the phase within the magnetic pole [φ=tan$^{-1}$(sin φ/cos φ)] from the two phase signals (sin φ and cos φ) obtained from those two magnetic sensor elements may be multiplied and calculated.

Figure 8:
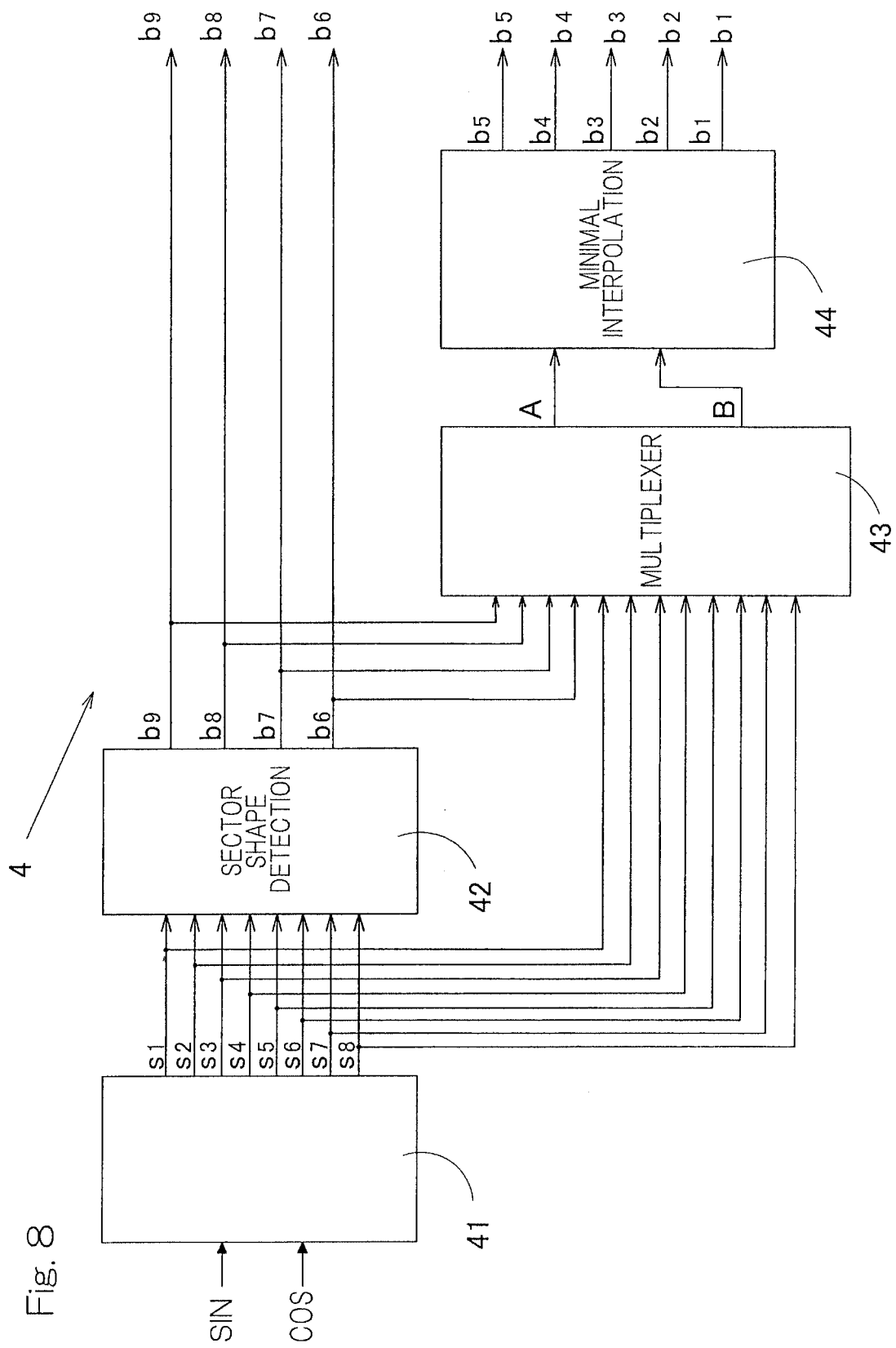
FIG. 8 is a block diagram showing one structural example of a multiplying segment employed in the rotation detector.
Figure 9:
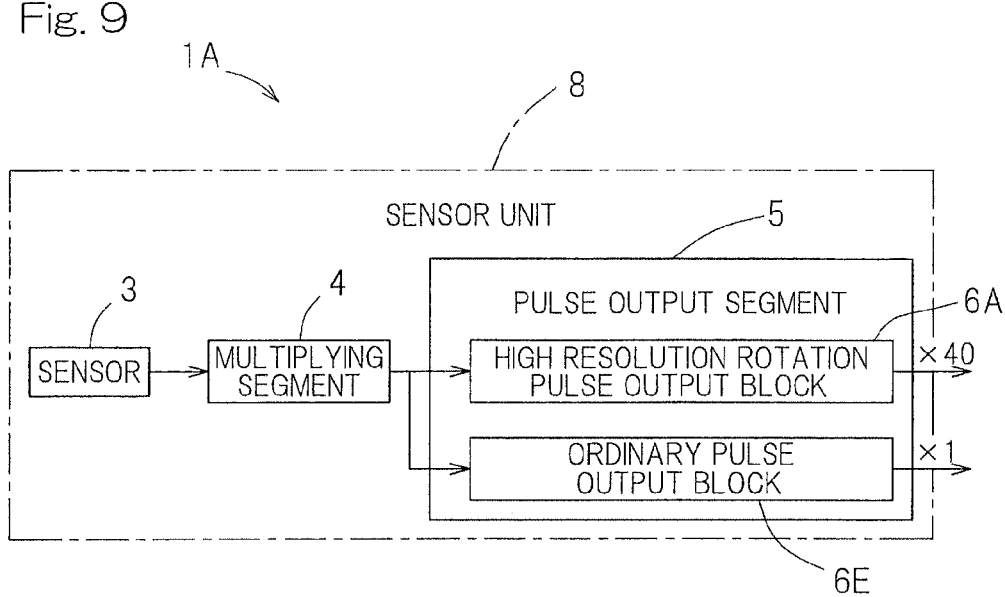
FIG. 9 is a block diagram showing a schematic structure of a sensor unit employed in the rotation detector.

The multiplying segment 4 in this case includes, as shown in FIG. 8, a signal generating block 41, a sector shape detecting block 42, a multiplexer block 43 and a minimal interpolation block 44. The signal generating block 41 is a block for successively outputting $2^{m-1}$ signals $s_i$ (where m is a positive integer smaller than n and i is a positive integer within the range of 1 to $2^{m-1}$), which have the same amplitudes $A_0$ and the same average values $C_0$ and are displaced in phase every $2\pi/2^{m-1}$ from each other from the two phase signals sin and cos that are respective outputs of the magnetic sensor 3.

The sector shape generating block 42 detects $2^m$ sector shapes $P_i$ divided by the $2^{m-1}$ signals $s_i$, which generate m digital signals $b_{n-m+1}$, $b_{n-m+2}$, ..., $b_{n-1}$ and $b_n$, which are so coded as to define $2^m$ equal sector shapes $P_i$.

The multiplexer block 43 is an analog block that is controlled by the m digital signals $b_{n-m+1}$, $b_{n-m+2}$, ..., $b_{n-1}$ and $b_n$ and processes the $2^{m-1}$ signals $s_i$, outputted from the signal generating block 41, to thereby output a signal A, which includes a portion between the average value C0 of the $2^{m-1}$ signals $s_i$ having a series of amplitudes and a first threshold value $L_1$, and a signal B which includes a portion between the first threshold value $L_1$ of the $2^{m-1}$ signals $s_i$ having the series of the amplitudes and a second threshold value $L_2$ higher than the first threshold value $L_1$.

The minimal interpolation block 44 is such that in order to obtain a desired resolving power they are multiplied to (n−m) digital signals $b_1$, $b_2$, ..., $b_{n-m-1}$ and $b_{n-m}$ ($b_1$, $b_2$, ..., $b_8$ and $b_9$ in the instance as shown) rotation pulses, which are so coded as to divide each of the $2^m$ sector shapes $P_i$ of $2\pi/2^m$ in angle into the same $2^{n-m}$ subsector shapes of $2\pi/2^m$.

Referring particularly to FIG. 1, the pulse output segment 5 outputs rotation pulses of at least two different magnification powers from the multiplied pulse b, which is a phase data within the to-be-detected poles (magnetic pole pairs) 2aa and inputted from the multiplying segment 4. In the instance now under discussion, as shown in detail in FIG. 11, the rotation pulses of three different magnification powers are simultaneously outputted respectively from a first high resolution rotation pulse output block 6A, a second high resolution rotation pulse output block 6B and an ordinary pulse output block 6EA. If the multiplication power N in the multiplying segment 4 is 20, the rotation pulse of, for example, a magnification power (×20) equal to the multiplication power N is outputted from the first high resolution rotation pulse output block 6A. In other words, the position (phase) within one magnetic pole pair 2aa of the magnetic encoder 2 is detected with 20 rotation pulses. Also, the rotation pulse of, for example, a predetermined magnification power (×10), lower than the multiplication power N, is outputted from the second high resolution rotation pulse output block 6B by frequency dividing the multiplied pulse b. From the ordinary pulse output block 6EA, the rotation pulse (one pulse for one magnetic pole pair) of, for example, a magnification power of 1 (×1) is outputted by further frequency dividing the multiplied pulse b. It is to be noted that the pulse output segment 5 may be provided with three or more high resolution rotation pulse output blocks.

Of the plural types of the rotation pulses of the different multiplying powers outputted from the pulse output segment 5, the rotation pulse of the lowest magnification power, for example, the rotation pulse of the magnification power of 1 (×1) in the instance now under discussion, is converted into an electric current output by a voltage to current converting circuit (not shown) provided in the subsequent stage. More specifically, as the electric current output, a pulse signal of 7 mA in electric current value and a pulse signal of 14 mA in electric current value are alternately outputted. Accordingly, it is possible to accommodate an input signal pattern of a process control device for processing the output signal of the rotation detector 1.

Referring to FIG. 1, the vehicle movement amount detecting section 16 is operable to detect the amount of movement of the automotive vehicle 20 from a signal outputted by the rotation detector 1 in the manner described above. More specifically, the vehicle movement amount is detected by the multiplied rotation pulse outputted by the pulse output segment 5. The detection of the vehicle movement amount is carried out by calculating the amount of movement of the automotive vehicle with the tire diameter of the vehicle wheel 21 and the number of pulses obtained from the rotation detector 1. Where the plurality of the outputs of the rotation detector 1 are used, the average value of the rotation pulse of each of the rotation detectors 1 may be used, or the vehicle movement amount may be calculated mainly by the output of one of the rotation detectors 1 and correction may be made with the rotation pulse of any other rotation detector 1.

The vehicle movement control section 17 is operable to control the movement of the automotive vehicle 20 with the utilization of the separation distance, detected by the separation distance measuring section 4, and the vehicle movement amount detected by the vehicle movement amount detecting section 16. The control of the movement of the automotive vehicle by means of the vehicle movement control section 17 is, for example, an automatic pilot to travel forwards and/or an automatic parking to park the automotive vehicle 20 at a target position. The vehicle movement control section 17 includes a traveling control segment 24 and a parking control segment 25, and traveling control segment 24 is operable to control the automatic pilot during the forward movement of the automotive vehicle, and the parking control segment 25 is operable to control the automatic parking of the automotive vehicle. The traveling control segment 24 and the parking control segment 25 initiate the control in response to an ON signal or the like of a predetermined operating switch in a console, and to cease the control in response to an OFF signal of the operating switch. The vehicle movement control section 17 includes, in addition to those described above, a traveling method determining segment 23 and a correcting segment 19. It is to be noted that the traveling control segment 24 and the parking control segment 25 may not be necessarily used to control the automatic pilot, but may be used to control an assistance to the traveling control and/or an assistance to the parking.

The control of the automatic pilot by the traveling control segment 24 is, for example, a tracking control to a leading automotive vehicle. This tracking control is a control to maintain the inter-vehicle gap between the own vehicle and the leading vehicle at a predetermined value and, basically, is a control to output an acceleration or deceleration command to a speed control unit 26 so that the inter-vehicle gap detected by the separation distance measuring section 14 may fall within a predetermined range. The traveling control segment 24 may also include a function of applying a braking command to a brake 28. The speed control unit 26 referred to above is a throttle valve in the case of an internal combustion engine vehicle such as, for example, a gasoline engine vehicle, and is a control device for a motor current in the case of an electrically powered vehicle. The speed control unit 26 includes a speed control block 26a for performing an electronic control thereof, and a command to accelerate or decelerate from the traveling speed control unit 24 is outputted to this speed control block 26a.

The traveling control segment 24 referred to above, when controlling so that the inter-vehicle gap may fall within the predetermined range as described above, obtains the highly accurate inter-vehicle gap by correcting or compensating the separation distance, detected by the inter-vehicle gap measuring block 14, with the vehicle movement amount detecting section 16 for detecting the vehicle movement amount from the output of the rotation detector 1, and then use it in the control. The correction referred to above is conducted by the correcting segment 19.

The correcting segment 19 corrects the separation distance, which is a measured value of the separation distance measuring section 14, by comparing the vehicle movement amount detected by the vehicle movement amount detecting section 16, and the separation distance measured by the separation distance measuring section 14. The correcting segment 19 compares, for example, during the time of travel over a predetermined distance, the travelling distance, detected by the rotation detector 1 and determined by the vehicle movement amount detecting section 16, and the travelling distance (that is, the difference between the distance to the object at the time of start of the distance measurement and the distance to the object at the time of termination of the distance measurement) measured by the separation distance measuring section 14, to thereby correct the separation distance that is the measured value of the separation distance measuring section 14. Accordingly, it is possible to accurately determine how far the distance to the object such as, for example, the leading vehicle is actually.

In the embodiment now under discussion, the rotation detector 1 may be of a design including an annular encoder 2 having a plurality of circumferentially equidistantly spaced to-be-detected poles provided on a rotating ring, forming a part of the wheel support bearing assembly for supporting the vehicle wheel, a sensor 3 for detecting the to-be-detected poles of the encoder 2, a multiplying segment 4 for multiplying the phase of the to-be-detected poles from an output of the sensor 3, and a pulse output segment 5 adapted to receive an output of the multiplying segment 4 or both of an output of the multiplying segment 4 and a detection output of the sensor 3 and for outputting pulses of at least two different magnification powers, in which the vehicle movement control section 17 is operable to perform a movement control of the automotive vehicle with the utilization of the pulse of at least one magnification power that is outputted by the pulse output segment 5 and the ABS control is conducted by the pulses of the other magnification power.

Since at this time, the vehicle movement amount detecting section 16 detects the vehicle movement amount with the use of a pulse output that is multiplied by the multiplying segment 4, the correcting segment 19 referred to previously can detect the traveling distance accurately. For this reason, the difference between the travelling distance determined by the vehicle movement amount detecting section 16 and the travelling distance measured by the separation distance measuring section 14 can be determined accurately and, hence, a highly accurate correction can be accomplished.

The traveling control segment 24 referred to previously operates to perform a control such as, for example, a tracking control of the automotive vehicle 20 with the use of the separation distance, measured by the separation distance measuring section 14, or the traveling distance detected by the vehicle movement amount detecting section 16, or both of the separation distance and the travelling distance after the separation distance measured by the separation distance measuring section 14 has been accurately determined by correcting it with the traveling distance determined by the rotation detector 1, having the multiplying segment 4, and the vehicle movement amount detecting section 16.

The traveling control segment 24 referred to above may be of a type having, in addition to the above mentioned tracking control, a steering control functionality. Where the steering control is to be performed, with the use of the steering angle of a handlebar outputted from a steering angle sensor 18 and the rotation pulse outputted from the rotation detector 1, a steering amount is determined in accordance with a preset rule (not shown) and is then outputted to a steering control block 27a of a steering mechanism 27. The steering mechanism 27 is a mechanism for changing the direction of a steering vehicle wheel of the automotive vehicle 20 and the steering control block 27a is a control means for activating the steering mechanism 27 in accordance with an input of a steering signal.

The parking control segment 25 referred to previously conducts an automatic parking, in which the automotive vehicle 20 is moved to and parked from the current position and direction to the target parking position and direction. Where the parking control segment 25 is employed, the automotive vehicle 20 is provided with a camera for imaging the surroundings. This camera may form a part of the separation distance measuring section 14 or may be provided separate from the separation distance measuring section 14. The parking control segment 25 processes an image taken by the previously described camera, determines the target parking position and parking direction from, for example, lines, drawn at the parking target position, and/or ambient walls, calculates according to the preset rule (not shown), the travelling distance and the steering amount both required to move the automotive vehicle from the current position and direction of the automotive vehicle 20 to the target parking position and in the parking direction, and outputs a command on the traveling velocity and the traveling direction required to move the automotive vehicle 20 to the target parking position and in the parking direction, and a command on the steering direction and the steering amount.

At the time of start of automatic parking and halfway during the automatic parking, the distance between the current position of the automotive vehicle and the target position is detected by the separation distance measuring section 14. In this automatic parking, the parking control segment 25 utilizes the correcting segment 19 to correct the distance, measured by the separation distance measuring section 14 such as, for example, the previously described camera with the utilization of the actual vehicle movement amount obtained from the rotation detector 1 and the vehicle movement amount detecting section 16. In this way, by correcting a detection value of the separation distance measuring section 14, the separation distance can be detected accurately and parking can be made to the target position and in the target direction accurately and, also, efficiently.

In the parking control segment 25, the necessity often occurs that the automotive vehicle 20 is either advanced or retracted, and the direction of travel of the automotive vehicle 20 is carried out by the forward or rearward traveling direction determining segment 23. Where the rotation detector 1 is of a type capable of outputting the phase difference signals of the A and B phases displaced 90° in phase from each other as hereinbefore described with particular reference to FIGS. 7A to 7C, the direction of rotation can be detected with those phase difference signals and the direction of travel of the automotive vehicle can be determined. The forward or rearward traveling direction determining segment 23 determines the vehicle traveling direction from the phase difference signals of the A and B phases.

According to the vehicle control device of the structure hereinabove described, at the outset the distance to the object such as, for example, the leading automotive vehicle is grasped with the separation distance measuring section 14 such as, for example, the laser radar shown in FIG. 1. Thereafter, the amount of movement of the automotive vehicle 20 is detected by the vehicle movement amount detecting section 16 and the high resolution rotation detector 1 having the multiplying section 4 best shown in FIG. 2. Also, by comparing the actual distance of travel determined by the high resolution rotation detector 1 and the vehicle movement amount detecting section 16 during the travel over the constant distance, it becomes possible to determine how far the distance to the object is accurately as compared with the conventional case. The vehicle movement amount control section 17 conducts the vehicle control such as, for example, the previously described automatic operation and/or the similarly described automatic parking, with the utilization of the detection value of the high resolution rotation detector 1 and the separation distance measuring section 14 such as, for example, the laser radar, after the distance to the object has been determined in the manner described above.

According to the vehicle control device of the structure hereinabove described, the use of the multiplying segment 4 in the rotation detector 1 in the manner described above is effective to achieve the rotation detection with a higher resolution than the pitch of arrangement of the detecting electrodes of the encoder 2. By performing the high resolution rotation detection, the accuracy, with which the amount of movement of the automotive vehicle is detected to such an extent enough to compensate for an error by the separation distance measuring section 14, can be increased. Also, when the rotation detector 1 is mounted on the wheel support bearing assembly, the rotation detector 1 can be installed compactly in the automotive vehicle with an undesirable increase of the number of assembling steps suppressed. It is, however, to be noted that where the encoder 2 is employed in the form of the magnetic encoder, the pitch of arrangement of the detecting electrodes will hardly be chosen to be small although a reduction in detecting performance, which would result from contamination, will little occur as compared with an optical one. However, the use of the multiplying segment 4 in the manner described above is effective to ensure that a required high resolving power can be obtained.

Figure 10:
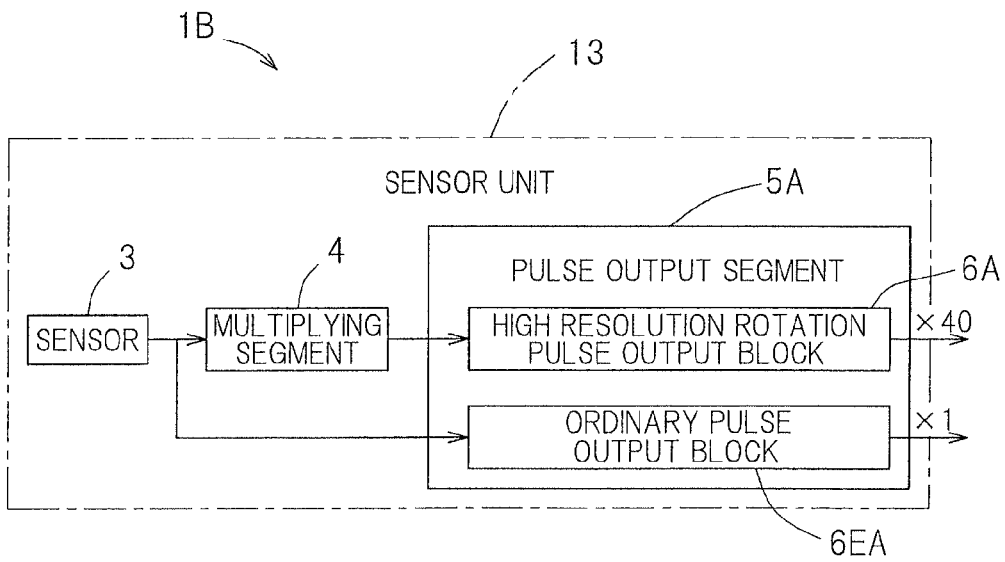
FIG. 10 is a block diagram showing the schematic structure of the sensor unit in the rotation detector 1 employed in the vehicle control device designed in accordance with a second embodiment.

FIG. 10 illustrates a block diagram showing a schematic structure of the sensor unit employed in the rotation detector, now identified by 1B, which is employed in the vehicle control device designed in accordance with a second embodiment. This rotation detector 1B includes, as the rotation pulse output block in the pulse output segment 5A, a high resolution rotation pulse output block 6A capable of outputting the rotation pulse of a high resolution (high magnification power) from the multiplying segment 4 and an ordinary pulse output block 6EA for outputting a pulse, obtained from the detection output of the sensor 3, without passing through the multiplying segment 4. From the high resolution rotation pulse output block 6A, the rotation pulse of, for example, a magnification power of 40 (×40) is outputted. The pulse obtained from the detection output of the sensor 3 is a pulse that is outputted as one pulse in correspondence with one to-be-detected pole of the encoder 2. As the high resolution rotation pulse output block 6A, that outputs the rotation pulse of any other type of the magnification power may be separately employed. Other structural features are similar to those shown in and described with particular reference to FIG. 1 in connection with the first embodiment of the present invention.

Figure 11:
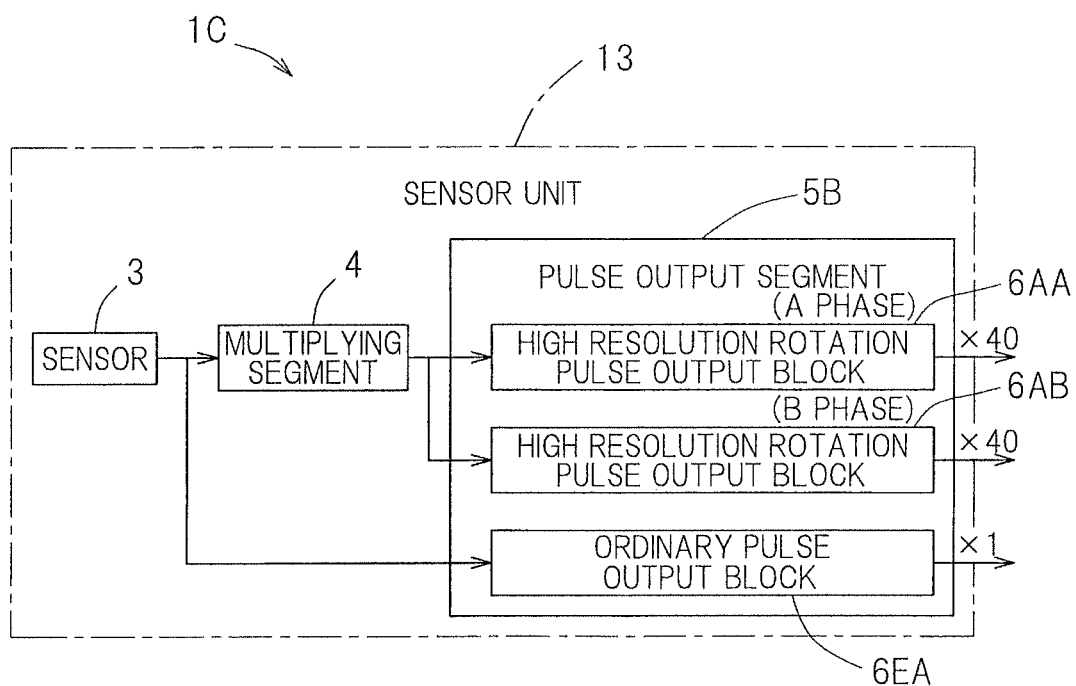
FIG. 11 is a block diagram showing the schematic structure of the sensor unit in the rotation detector 1 employed in the vehicle control device designed in accordance with a third embodiment.

FIG. 11 illustrates a block diagram showing a schematic structure of the sensor unit employed in the rotation detector, now identified by 1C, which is employed in the vehicle control device designed in accordance with a third embodiment. This rotation detector 1C is similar to that employed in the practice of the second embodiment shown in and described with particular reference to FIG. 10, but differs therefrom in that as the high resolution rotation pulse output block in the pulse output segment 5B for outputting the rotation pulse of at least one magnification power, a pair of high resolution rotation pulse output blocks 6AA and 6AB for outputting respectively the rotation pulse of the A phase and the rotation pulse of the B phase, which are displaced 90° in phase from each other. Other structural features are similar to those shown in and described with particular reference to FIG. 10 in connection with the second embodiment.

As hereinabove described, by outputting the phase difference signals of the A and B phases, displaced 90° in phase from each other, as the rotation pulses of the same magnification power, the direction of rotation can be detected. When this rotation detector 1 is mounted on the wheel support bearing assembly for the automotive vehicle, selective forward and rearward of the automotive vehicle can be detected.

Figure 12:
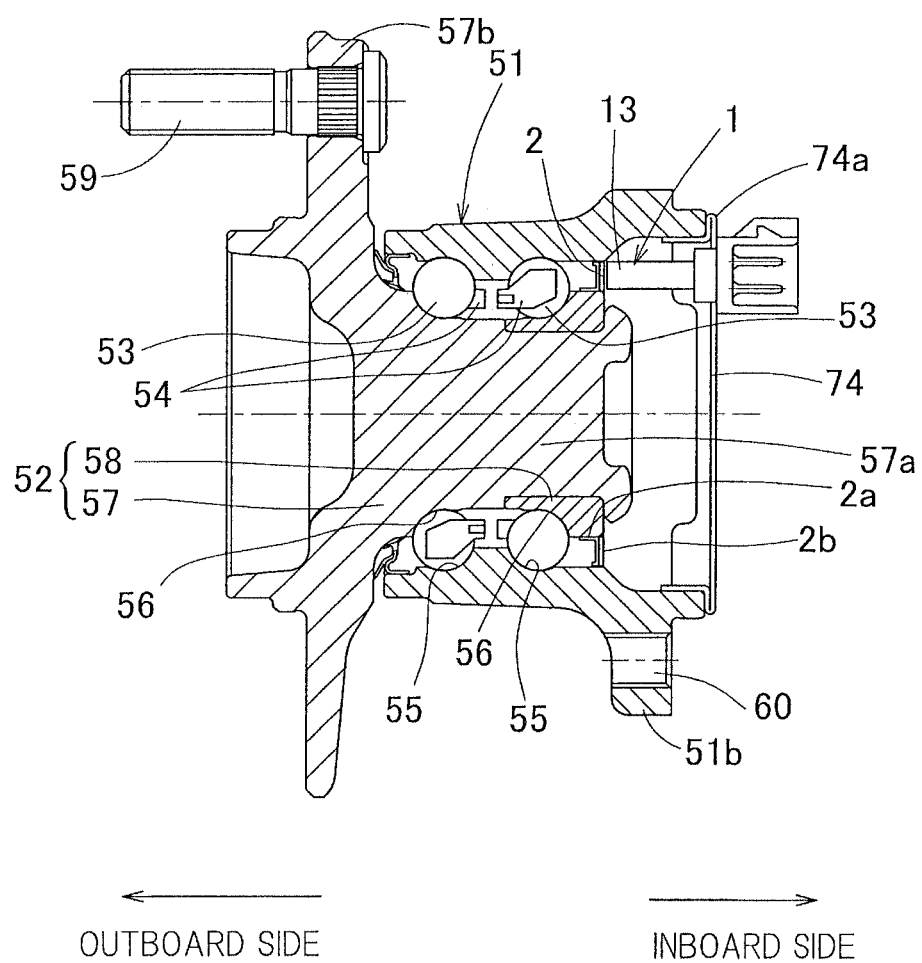
FIG. 12 is a block diagram showing the schematic structure of the sensor unit in the rotation detector 1 employed in the vehicle control device designed in accordance with a fourth embodiment.
Figure 13:
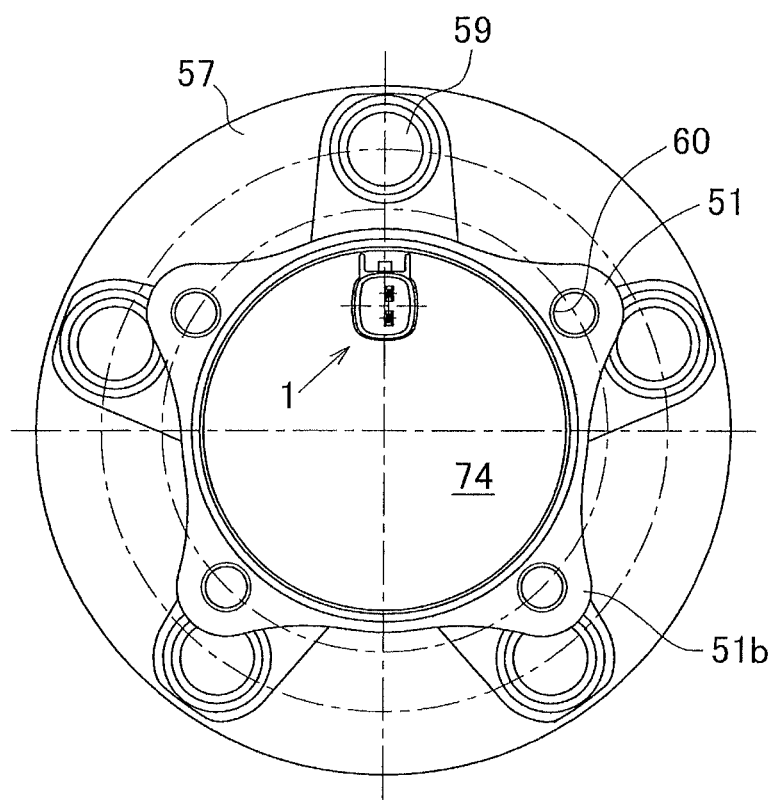
FIG. 13 is a side view showing the rotation detector equipped vehicle wheel support bearing assembly as viewed from the inboard side.

With particular reference to FIGS. 12 and 13, a rotation detector equipped wheel support bearing assembly employed in the vehicle control device designed in accordance with a fourth embodiment will be described in detail. FIGS. 12 and 13 illustrates the rotation detector equipped wheel support bearing assembly similar to that shown in and described with reference to FIGS. 3 and 4, but used for the support of a vehicle driven wheel, in which the hub axle 57 has no center bore and is rendered to be solid. An outer member 51 has an inboard end extending axially beyond the inner member 52, having its end face opening covered by a cap 74. The cap 74 is mounted on and fitted to an inner periphery of the outer member 51 by means of a collar 74a provided in an outer peripheral edge. A sensor unit 13 is fitted to this cap 74 so as to confront the magnetic encoder 2. A rotation detector body is provided in the cap 74 removably with the use of bolts and nuts, both not shown, in a condition with at least the sensor unit 13 of the rotation detector 1 mounted. In a condition with the sensor unit 13 mounted on the cap 74, the structure is such that by the elasticity of a molding material (an elastic material) covering the sensor unit 13, an annular gap of the cap 74 delimited between it and the rotation detector body can be tightly sealed. The magnetic encoder 2 is mounted on and is fitted to an outer periphery of an inner ring 58 and confronts the rotation detector 1 in an axial direction.

In the case of the construction described above, although limited to the use for supporting the vehicle driven wheel, since the end opening in its entirety of the outer member 51 is covered by the cap 4, an undesirable ingress of muddy water or the like from the outside into a site of installation of the rotation detector 1 can be avoided and, hence, the reliability of the rotation detector 1 can be increased.

Figure 14:
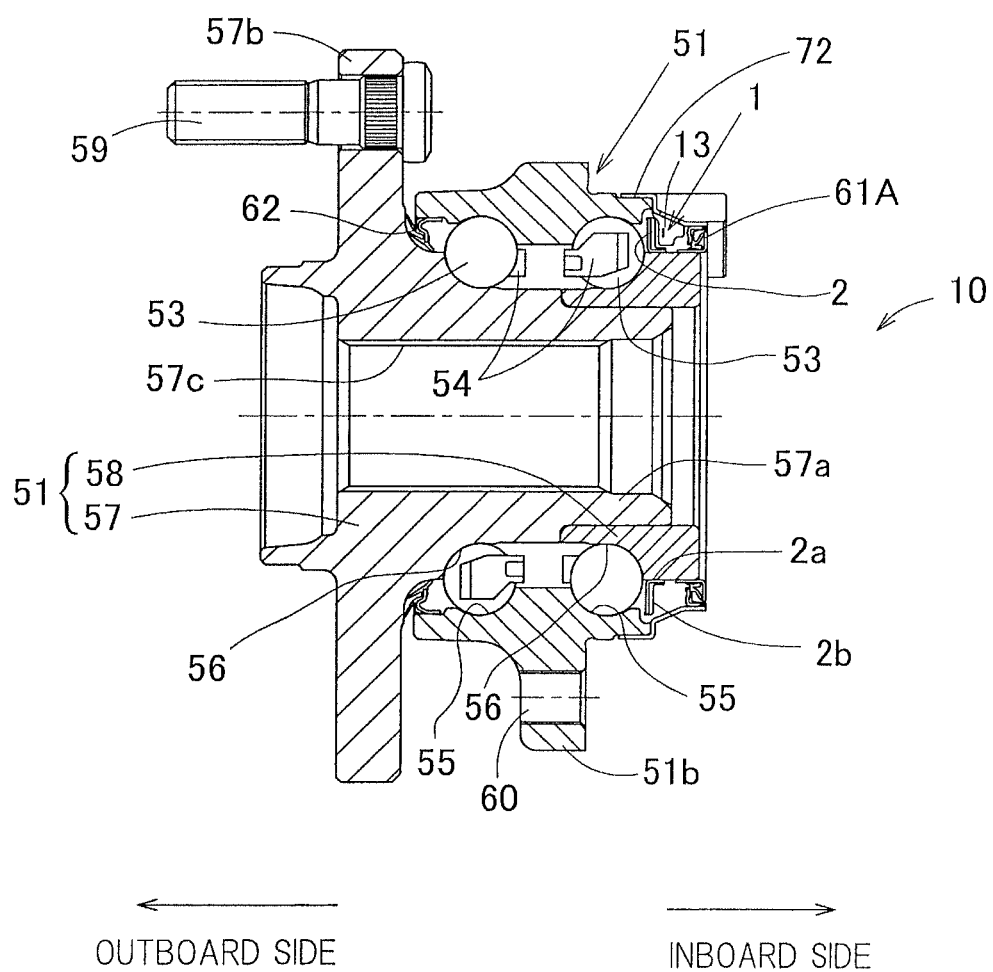
FIG. 14 is a sectional view showing the rotation detector equipped wheel support bearing assembly employed in the vehicle control device designed in accordance with a fifth embodiment.
Figure 15:
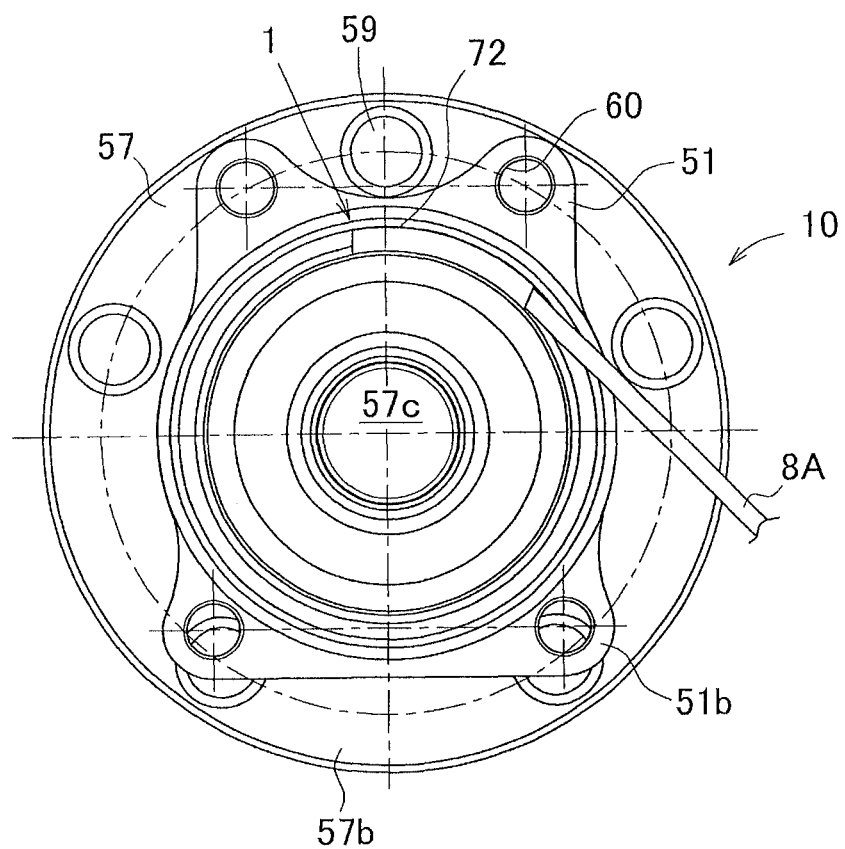
FIG. 15 is a side view showing the rotation detector equipped vehicle wheel support bearing assembly as viewed from the inboard side.

With particular reference to FIGS. 14 and 15, a rotation detector equipped wheel support bearing assembly employed in the vehicle control device designed in accordance with a fifth embodiment will be described in detail. FIGS. 14 and 15 illustrate the rotation detector equipped wheel support bearing assembly similar to that shown in and described with reference to FIGS. 3 and 4, but differing therefrom in that the sealing member 61 for sealing the bearing space on the inboard side is arranged outside the magnetic encoder. In other words, the sealing member 61 comprised of a contact seal or the like is provided between an annular sensor mounting member 72, fitted to the outer member 51, and the inner ring 58. In the case of the construction described above, by the sealing member 61, the magnetic encoder 2 is sealed off from the exterior space and, hence, an undesirable biting of foreign matter between the magnetic encoder 2 and the sensor unit 13 can be avoided. The magnetic encoder 2 is similar to that shown in and described with particular reference to FIG. 3. Other structural features and effects are similar to those afforded by the embodiment shown in and described with particular reference to FIGS. 3 and 4.

With particular reference to FIG. 16 and FIGS. 5A and 5B to FIG. 8, reference to the latter having been made hereinbefore, a sixth embodiment will now be described in detail. In this sixth embodiment, component parts similar to or identical with those shown and described in connection with the first embodiment will be designated by like reference numerals and, therefore, the details thereof are not reiterated. The rotation detector, now identified by 1D, according to this sixth embodiment includes, in addition to the encoder 2, the sensor 3, the multiplying segment 4 and the pulse output segment 5C, all referred to previously in connection with the first embodiment, a speed detecting segment 37 for detecting the rotational speed of a rotor to which the encoder 2 is fitted, and a pulse selecting and outputting segment 38 for selecting and outputting a rotational pulse of one type of the magnification power of the rotation pulses outputted by the pulse output segment 5C according to the rotating velocity detected by the speed detecting segment 37.

Figure 16:
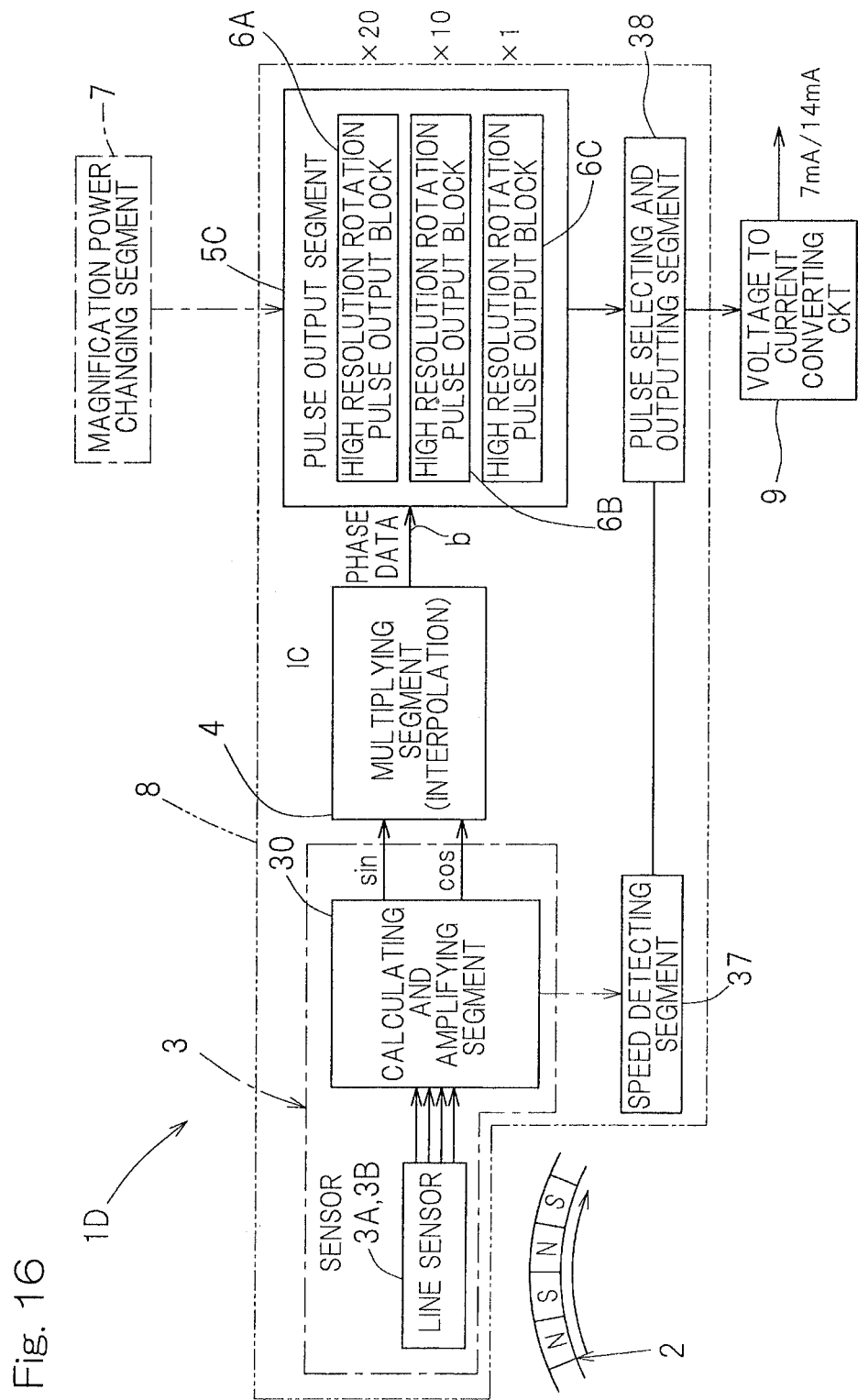
FIG. 16 is a block diagram showing the rotation detector equipped wheel support bearing assembly employed in the vehicle control device designed in accordance with a sixth embodiment.

It is to be noted that although in the instance now under discussion, the magnification power of the rotation pulse outputted from the pulse output segment 5 referred to above has been fixed to the magnification powers of 20, 10 and 1, a magnification power changing segment 7 may be provided outside, as shown by the imaginary line in FIG. 16, so that the magnification power of the rotation pulse outputted can be changed according to a command from the magnification power changing segment 7.

The speed detecting segment 37 is operable to detect the rotational speed of the rotor of the object to be detected, from the output of the magnetic sensor 3. The magnetic sensor 3, the multiplying segment 4, the pulse output segment 5C, the speed detecting segment 37 and the pulse selecting and outputting segment 11 are integrated on a common integrated circuit 8 and is provided with an output terminal from which the rotational pulse of one type of the magnification power selected by the pulse selecting and outputting segment 38 is outputted. Accordingly, mounting of the rotation detector 1 on the vehicle wheel support bearing assembly or the like can be performed compactly and a reduction of the weight becomes also possible.

Of a plurality of types of rotation pulses of different magnification powers that are outputted by the pulse output segment 5C and selected and outputted by the pulse selecting and outputting segment 38, the rotation pulse of the smallest magnification power, that is, the rotation pulse of the magnification power of 1 ($\times$1) in the embodiment now under discussion is converted into an electric current output by the voltage to current converting circuit 9 provided in the subsequent stage. More specifically, as the electric current output, the pulse signal of 7 mA in electric current value and the pulse signal of 14 mA in electric current value are outputted alternately. Accordingly, it is possible to accommodate an input signal pattern of a process control device for processing the output signal of the rotation detector 1.

The voltage to current converting circuit 9 is surface mounted on a printed substrate (not shown), together with the integrated circuit 8 and is enclosed by a molding material. The molding material is, for example, a resin. Accordingly, it is possible to secure a water proofing property and an impact resistance of the rotation detector 1.

According to the rotation detector 1 of the construction described hereinabove, since the multiplied pulse b of a high magnification power, in which the phase within the to-be-detected poles 2aa of the encoder 2 has been multiplied, is outputted form the multiplying segment 4; also, since in the pulse output segment 5C based on the multiplied pulse b, the rotational pulses of the two or more types having the different magnification powers are outputted; and moreover since in dependence on the rotational speed of the rotor of the object to be detected, which velocity is detected by the speed detecting segment 10, one of the rotation pulses outputted by the pulse output segment 5C, which has one type of the magnification power, is sequentially outputted by the pulse selecting and outputting segment 38, the detection resolving power can be selected in dependence on the rotational speed of the rotor, the detected rotation signal can be processed even with the process control device of a type having the standard input signal resolving power and, hence, the rotation detection can be accomplished with a high accuracy.

In other words, when, for example, the rotation detector 1D of the high resolving power is incorporated in the wheel support bearing assembly and is the used for detecting the rotation, and if the signal processing capability of the vehicle ABS control device, which is one kind of the vehicle control device, is standard, the ABS control device will be unable to process the input signal when the high resolution rotation pulse is inputted during a high speed travel of the automotive vehicle or, otherwise, the processing will be delayed. In the case of this rotation detector 1D, despite of the high resolving power, the pulse selecting and outputting segment 38 selects the rotation pulse of a low magnification power during the high speed travel of the automotive vehicle and inputs it to the ABS control device, but during a low speed travel of the automotive vehicle, it selects the rotation pulse of a high magnifying pulse and then inputs to the ABS control device, and, accordingly, even with the standard ABS control device, the signal processing can be sufficiently accomplished.

By way of example, where as the high resolution rotation pulse output blocks 6A, 6B and 6C of the pulse output segment 5C, those capable of outputting the rotation pulses of respective magnification powers of 40, 20 and 2 are made available, as one example of pulse selection conducted by the pulse selecting and outputting segment 38, it is possible to select the rotation pulses of the various magnification powers according to the speed in such a way as to select the rotation pulse of 40 in magnification power when in a speed region up to 40 km per hour and to select the rotation pulse of 2 in magnification power when in a speed region higher than 40 km per hour.

Also, as another example, the rotation pulses of the various magnification powers can be selected according to the speed in such a way as to select the rotation pulse of 40 in magnification power when in a speed region up to 40 km per hour, to select the rotation pulse of 20 in magnification power when in a speed region between 40 to 80 km per hour, and to select the rotation pulse of 2 in magnification power when in a speed region higher than 40 km per hour.

As discussed above, since if by the pulse selecting and outputting segment 38, the rotation pulse of a high magnification power is selected and outputted when the rotational speed detected by the speed detecting segment 37 is low, and the rotation pulse of a low magnification power is selected and outputted when the rotational speed detected thereby is high, it is possible to minimize the number of the rotation pulses per unitary time without being affected by the rotational speed, it is possible to sufficiently accommodate even though the process control device such as, for example, the ABS control device for receiving and inputting the rotation pulses has the conventional, standard input signal resolving power.

Also, since in this embodiment now under discussion, one encoder 2 is employed and the detection output of the sensor 3, which detects the to-be-detected poles 2aa of the encoder 2 is inputted to the multiplying segment 4, there is no need to employ two types of sensors for simultaneously outputting the rotation pulse of the high resolving power (high magnification power) and the rotation pulse of the low resolving power (low magnification power) and, therefore, an undesirable increase of the space can be suppressed.

Figure 17:
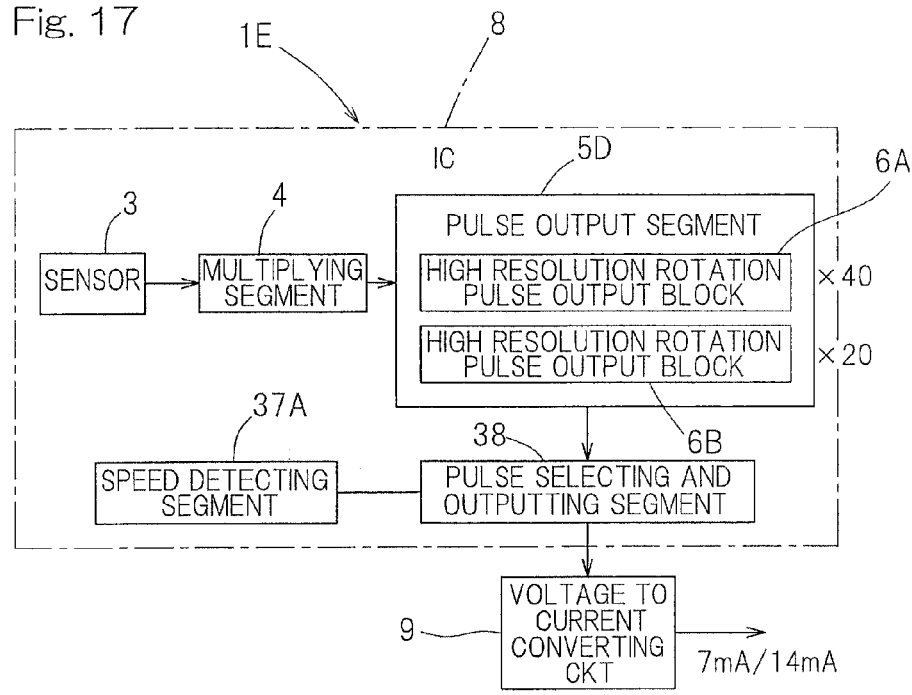
FIG. 17 is a block diagram showing the rotation detector equipped wheel support bearing assembly employed in the vehicle control device designed in accordance with a seventh embodiment.

FIG. 17 illustrates a block diagram showing a schematic structure of the rotation detector 1E employed in the vehicle control device designed in accordance with a seventh embodiment. The rotation detector, now identified by 1E in FIG. 17, makes use of a speed detecting segment 37A so configured as to detect the rotational speed of the rotor of the object to be detected, from the output of an external sensor (now shown) separate from the magnetic sensor 3. As the rotation pulse output unit in the pulse output segment 5D, it is rendered to have the high resolution rotation pulse output block 6A capable of outputting the rotation pulse of a high magnification power (for example, 40 in magnification power) from the output of the multiplying segment 4 and the high resolution rotation pulse output block 6B capable of outputting the rotation pulse of a low magnification power. Other structural features are similar to those shown in and described with reference to FIG. 16 in connection with the sixth embodiment.

Figure 18:
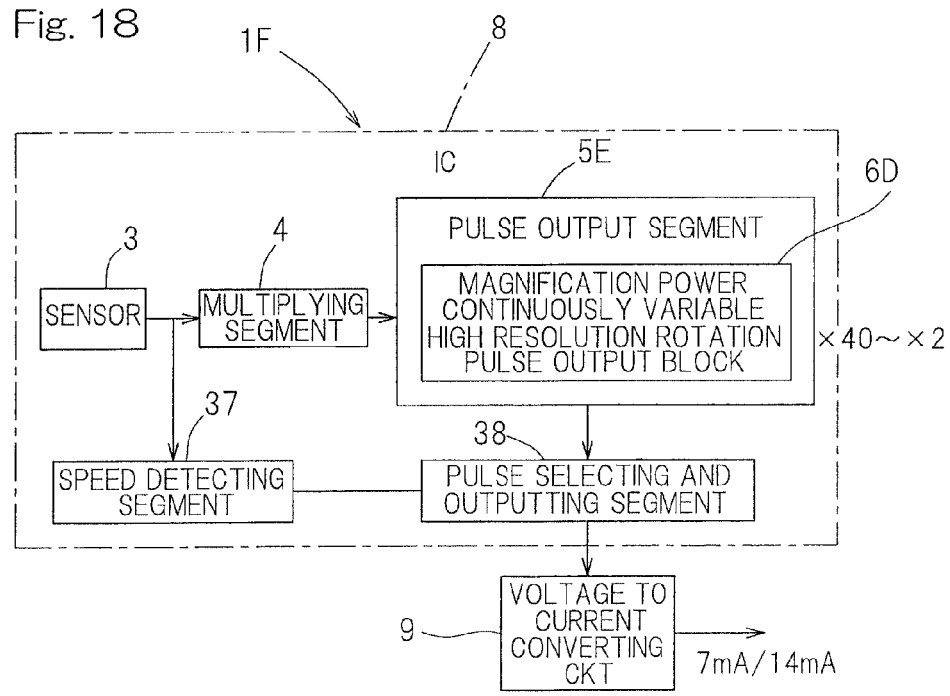
FIG. 18 is a block diagram showing the rotation detector equipped wheel support bearing assembly employed in the vehicle control device designed in accordance with an eighth embodiment.

FIG. 18 illustrates a block diagram showing a schematic structure of the rotation detector 1F employed in the vehicle control device designed in accordance with an eighth embodiment. The rotation detector, now identified by 1G in FIG. 18, is similar to that shown in and described with particular reference to FIG. 16 in connection with the sixth embodiment, but differs therefrom in that the high resolution rotation pulse output block 6D in the pulse output segment 5E is modified to have a capability of continuously varying the magnification power of the rotation pulse (for example, 40 to 2 in magnification power) and the pulse selecting and outputting segment 38 is so modified as to continuously variably select and output the rotation pulse of a magnification power appropriate to the rotational speed detected by the speed detecting segment 37. Other structural features are similar to those shown in and previously described with reference to FIG. 16. In the case of this embodiment, the magnification power of the output pulse can be carefully selected in dependence on a change in rotational speed.

Figure 19:
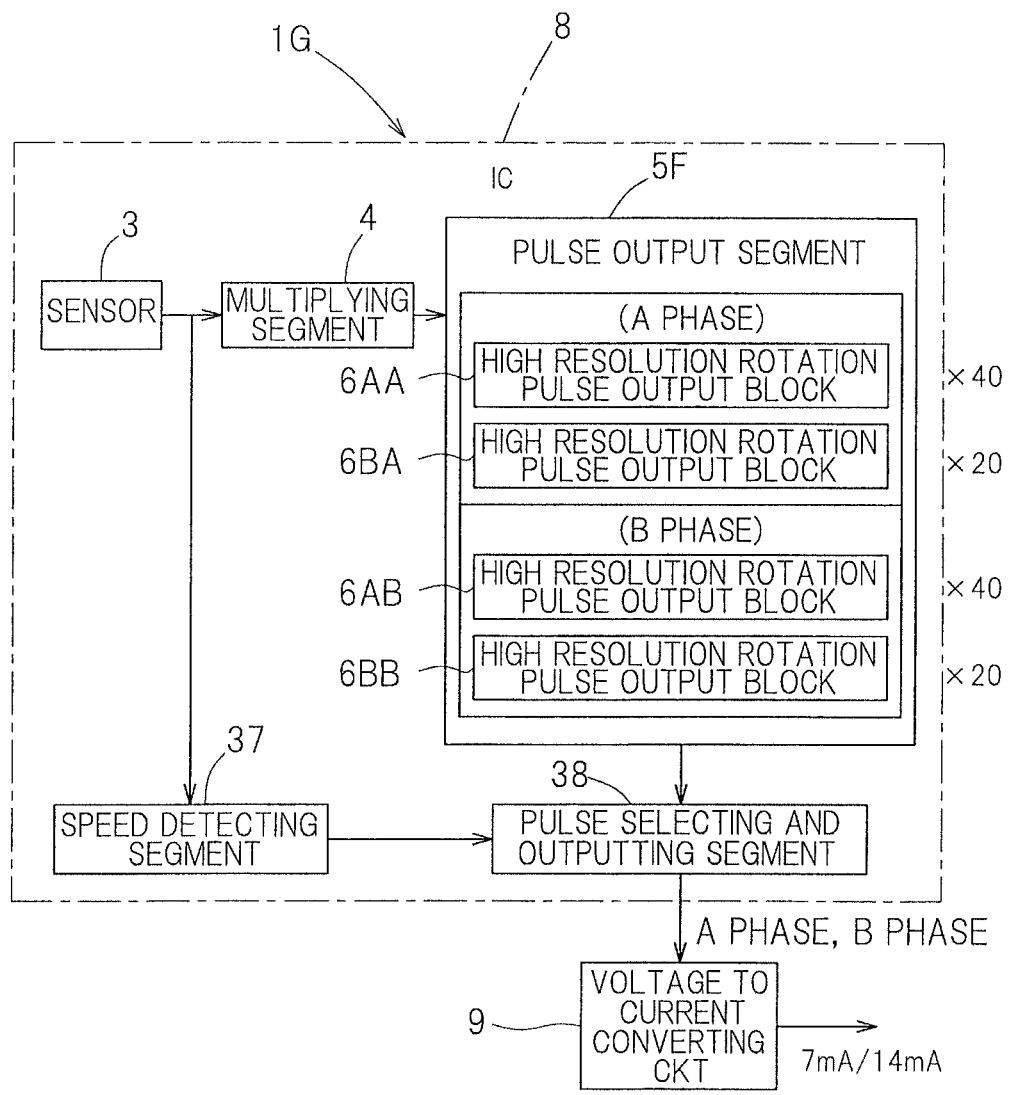
FIG. 19 is a block diagram showing the rotation detector equipped wheel support bearing assembly employed in the vehicle control device designed in accordance with a ninth embodiment.

FIG. 19 illustrates a block diagram showing a schematic structure of the rotation detector 1G employed in the vehicle control device designed in accordance with an eighth embodiment. The rotation detector, now identified by 1G in FIG. 19, is similar to that shown in and described with particular reference to FIG. 16 in connection with the previously described sixth embodiment, but differs therefrom in that as a high resolution rotation pulse output block, employed in the pulse output segment 5C, for outputting the rotation pulse of at least one magnification power, a pair of high resolution rotation pulse output blocks capable of individually outputting the A phase and B phase rotation pulses that are 90° displaced in phase from each other are employed. In FIG. 19, the pair of the high resolution rotation pulse output blocks 6AA and 6AB (40 in magnification power) capable of outputting the A phase and B phase rotation pulses of a high magnification power and the pair of high resolution rotation pulse output blocks 6BA and 6BB capable of outputting the A phase and B phase rotation pulses of a low magnification power are employed. The pulse selecting and outputting segment 38 outputs the A phase and B phase rotation pulses together when the rotation pulse of the high magnification power is selected or when the rotation pulse of the low magnification power is selected. In view of the above, the pulse selecting and outputting segment 38 is provided with two output terminals for the A phase and the B phase, respectively. Other structural features are similar to those shown in and previously described with reference to FIG. 16 in connection with the sixth embodiment.

As hereinbefore described, by outputting, as the rotation pulse signal of the same magnification power, the phase difference signal of the A and B phases displaced 90° relative to each other, the direction of rotation can become detected. When this rotation detector 1G is mounted on the vehicle wheel support bearing assembly for the automotive vehicle, selective forward and rearward travel of the automatic vehicle can be detected.

As shown in FIG. 3, the sensor part (a portion where the sensor 3 is embedded) 13 of the rotation detector 1G is fitted to the inboard end side of the outer member 51 through the sensor mounting member 72. The sensor mounting member 72 is a ring shaped metallic plate adapted to be mounted on the outer peripheral surface of the outer member 51 and held in contact with an end face thereof, and has circumferential portion provided with a sensor mounting piece 72a to which the rotation detector 1 is fitted.

According to the rotation detector equipped wheel support bearing assembly 10 of the structure hereinbefore detailed, since depending on the vehicle speed, the detection resolving power of the rotation detector 1D to 1G shown in FIGS. 16 to 19 can be selected, the detected rotation signal can be processed even though the ABS control device of the electric control unit on the vehicle side, which processes the output signal of the rotation detector 1D to 1G, is standard. In other words, if the signal processing capability of the ABS control device is standard, it often occur that when during the high speed travel the high resolution rotation pulse is inputted the ABS control device fails to deal with the input signal or the processing thereby is delayed, but if the rotation pulse of the low magnification power is selected and inputted during the high speed travel, but the rotation pulse of the high magnification power is selected and inputted during the low speed travel, the signal processing can be sufficiently accomplished even with the standard ABS control device.

It is to be noted that although in describing any one of the various embodiment of the present invention, reference has been made to the wheel support bearing assembly 10 of the third generation type, the rotation detector equipped wheel support bearing assembly 10 of the present invention can be equally applied to any of the first and second generation types, in which the hub and the bearing are provided separately, and also to the fourth generation type, in which the inner member includes a hub wheel and a constant velocity universal joint outer ring. Also, the present invention can be applied to the wheel support bearing assembly, in which the outer member forms a rotating member and the inner member forms a stationary member. Yet, the present invention can be equally applied not only to the angular contact ball bearing type, but also any other wheel support bearing. Furthermore, the to-be-detected poles employed in the rotation detector 1 may not be necessarily limited to the magnetic encoder, but may be, for example, a serrated pulsar ring made of a metallic material.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1, 1A to 1G . . . Rotation detector
2 . . . Encoder
3 . . . Sensor
4 . . . Multiplying segment
5, 5A to 5F . . . Pulse output segment
6A, 6AA, 6AB, 6B, 6C, 6D . . . High resolution rotation pulse output block
6E, 6EA . . . Ordinary pulse output unit
7 . . . Magnification power changing segment
8 . . . Integrated circuit
9 . . . Voltage to current converting circuit
10 . . . Rotation detector equipped wheel support bearing assembly
14 . . . Separation distance measuring section
15 . . . Vehicle mounted ECU
16 . . . Vehicle movement amount detecting section
17 . . . Vehicle movement control section
19 . . . Correcting segment
20 . . . Automotive vehicle
21 . . . Vehicle wheel
23 . . . Travelling control unit
24 . . . Traveling control segment
25 . . . Parking control segment
37, 37A . . . Speed detecting segment
38 . . . Pulse selecting and outputting segment

What is claimed is:
1. A vehicle control device comprising:
a rotation detector to detect a rotational speed of a vehicle wheel;
a vehicle movement amount detecting section to detect an amount of movement of a vehicle from a signal outputted by the rotation detector;
a separation distance measuring section to measure, on a non-contact basis, the separation distance between the vehicle and an object located at a position within a region measurable from the vehicle; and
a vehicle movement control section to control the movement of the vehicle with the utilization of the separation distance detected by the separation distance measuring section, and the amount of movement of the vehicle detected by the vehicle movement amount detecting section,
wherein the rotation detector includes
an annular encoder provided in a rotating ring, forming a part of a wheel support bearing assembly for supporting the vehicle wheel and having a plurality of circumferentially juxtaposed and equidistantly spaced to-be-detected poles, a sensor to detect the to-be-detected poles of the encoder, a multiplying segment to multiply the phase of the to-be-detected poles from an output of the sensor, and a pulse output segment adapted to receive an output of the multiplying segment or to receive both of the output of the multiplying segment and a detection output of the sensor to output pulses of at least two different magnification powers, the pulse of one of the magnification powers outputted by the pulse output segment being a phase difference signal of A and B phases different in phase by 90 degrees from each other, wherein the vehicle movement amount detecting section is operable to detect the amount of movement of the vehicle from a pulse output multiplied by the multiplying segment.

2. The vehicle control device as claimed in claim 1, wherein the separation distance measuring section is capable of measuring the separation distance to an object by means of an optical technique.

3. The vehicle control device as claimed in claim 1, wherein the vehicle movement control section includes a correcting segment provided therein to correct the separation distance, which is a measured value of the separation distance measuring section, by comparing the amount of movement of the vehicle, detected by the vehicle movement amount detecting section with the separation distance, measured by the separation distance measuring section.

4. The vehicle control device as claimed in claim 3, wherein the correcting segment is operable to conduct the correction by using the pulse output multiplied by the multiplying segment.

5. The vehicle control device as claimed in claim 3, wherein the vehicle movement control section conducts a vehicle control with the use of the separation distance detected by the separation distance measuring section or the rotational speed detected by the rotation detector, after the separation distance has been measured by the separation distance measuring section.

6. The vehicle control device as claimed in claim 5, wherein the vehicle control after the measurement of the separation distance by the separation distance measuring section is conducted by using the pulse output multiplied by the multiplying segment.

7. The vehicle control device as claimed in claim 5, wherein the vehicle movement control section conducts a movement control of the vehicle with the use of the pulses of the at least two magnification powers.

8. The vehicle control device as claimed in claim 1, wherein the vehicle movement control section conducts a movement control of the vehicle with the use of a pulse of one of the magnification powers outputted by the pulse output segment and, also, an ABS control by means of a pulse of the other magnification power.

9. The vehicle control device as claimed in claim 7, wherein the pulse output segment outputs a pulse of the smallest magnification power, which is identical with the number of pulses outputted by the sensor.

10. The vehicle control device as claimed in claim 1, wherein the vehicle movement control section includes a forward-rearward movement direction determining segment to determine whether the direction of movement of the vehicle is forward or rearward.

11. The vehicle control device as claimed in claim 1, wherein a vehicle control conducted by the vehicle movement control section is an automatic operation for forward movement or an automatic parking to park the vehicle at a target position.

12. A rotation detector forming a part of a wheel support bearing assembly for supporting a vehicle wheel having a rotating ring and a rotor, the rotation detector comprising:

an annular encoder provided in the rotating ring, the annular encoder having a plurality of circumferentially juxtaposed and equidistantly spaced to-be-detected poles;

a sensor to detect the to-be-detected poles of the encoder;

a multiplying segment to multiply the phase of the to-be-detected poles from an output of the sensor;

a pulse output segment adapted to receive an output of the multiplying segment to output purses of at least two different magnification powers;

a speed detecting segment to detect the rotational speed of the rotor; and a pulse selecting and outputting segment to select and output the pulse of one of the magnification powers of the pulses outputted by the pulse output segment in dependence on the rotational speed detected by the speed detecting segment, the pulse selecting and outputting segment selecting and outputting the pulse of the highest magnification power when a value of the rotational speed detected by the speed detecting segment is lower than a predetermined value, and outputs the pulse of the lowest magnification power when the a value of the rotational speed so detected is higher than the predetermined value.

13. A rotation detector forming a part of a wheel support bearing assembly for supporting a vehicle wheel having a rotating ring and a rotor, the rotation detector comprising:

an annular encoder provided in a rotating ring, forming a part of a wheel support bearing assembly for supporting the vehicle wheel and having a plurality of circumferentially juxtaposed and equidistantly spaced to-be-detected poles;

a sensor to detect the to-be-detected poles of the encoder;

a multiplying segment to multiply the phase of the to-be-detected poles from an output of the sensor;

a pulse output segment adapted to receive an output of the multiplying segment to output pulses of at least two different magnification powers;

a speed detecting segment to detect the rotational speed of the rotor; and a pulse selecting and outputting segment to select and output the pulse of one of the magnification powers of the pulses outputted by the pulse output segment in dependence on the rotational speed detected by the speed detecting segment, the pulse output segment being capable of changing continuously the magnification power of the pulse outputted by the pulse output segment and the pulse selecting and outputting segment being capable of continuously variably selecting and outputting the pulse of the magnification power corresponding to the rotational speed detected by the speed detecting segment.

14. The rotation detector as claimed in claim 12, wherein the speed detecting segment is such that the sensor detects the rotational speed from an output of an extra sensor.

15. The rotation detector as claimed in claim 12, further comprising a magnification power changing segment to change from outside a setting of the magnification power of the pulse outputted by the pulse output segment.

16. The rotation detector as claimed in claim 12, wherein the number of the encoder is one and a detection output of the sensor for detecting the to-be-detected poles of the encoder is inputted to the multiplying segment.

17. The rotation detector as claimed in claim 12, wherein the encoder is a magnetic encoder.

18. The rotation detector as claimed in claim 12, wherein the sensor is in the form of a line sensor having a plurality of sensor elements juxtaposed in a direction conforming to the direction of arrangement of the to-be-detected poles of the encoder and outputs two phase sinusoidal signals by means of calculation to detect the phase within one to-be-detected pole.

19. A rotation detector equipped bearing assembly having incorporated therein the rotation detector as defined in claim 12.

20. The rotation detector equipped bearing assembly as claimed in claim 19, wherein the bearing assembly is a vehicle wheel support bearing assembly for supporting a driven wheel and further comprising a cap for covering the sensor.

21. The rotation detector equipped bearing assembly as claimed in claim 19, wherein the bearing assembly is a vehicle wheel support bearing assembly for supporting a drive wheel and further comprising a sealing member for sealing a bearing end portion of a bearing space formed between an outer member and an inner member, the outer and inner members being rotatable relative to each other, and wherein the sensor is provided at a location on an inner side of the sealing member.

\* \* \* \* \*

UNITED STATES PATENT AND TRADEMARK OFFICE
CERTIFICATE OF CORRECTION

| | |
|---|---|
| PATENT NO. | : 8,798,906 B2 |
| APPLICATION NO. | : 13/353846 |
| DATED | : August 5, 2014 |
| INVENTOR(S) | : Kiyotake Shibata |

It is certified that error appears in the above-identified patent and that said Letters Patent is hereby corrected as shown below:

In the Claims

Column 26, Line 28, In Claim 12, delete "the a" and insert -- a --, therefor.

Signed and Sealed this
Twenty-fourth Day of February, 2015

Michelle K. Lee
*Deputy Director of the United States Patent and Trademark Office*